(12) United States Patent
Shveidel et al.

(10) Patent No.: US 11,409,454 B1
(45) Date of Patent: Aug. 9, 2022

(54) CONTAINER OWNERSHIP PROTOCOL FOR INDEPENDENT NODE FLUSHING

(71) Applicant: EMC IP Holding Company LLC, Hopkinton, MA (US)

(72) Inventors: Vladimir Shveidel, Pardes-Hana (IL); Vamsi K. Vankamamidi, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/236,887

(22) Filed: Apr. 21, 2021

(51) Int. Cl.
*G06F 3/06* (2006.01)

(52) U.S. Cl.
CPC .............. *G06F 3/064* (2013.01); *G06F 3/067* (2013.01); *G06F 3/0619* (2013.01); *G06F 3/0635* (2013.01); *G06F 3/0659* (2013.01); *G06F 3/0683* (2013.01)

(58) Field of Classification Search
CPC ...... G06F 3/064; G06F 3/0619; G06F 3/0635; G06F 3/0659; G06F 3/067; G06F 3/0683
See application file for complete search history.

(56) References Cited

U.S. PATENT DOCUMENTS

2017/0289290 A1* 10/2017 Bhagwat ............. H04L 67/1097

OTHER PUBLICATIONS

Vladimir Shveidel, et al., "Smooth Flushing of Cached Write Data," U.S. Appl. No. 17/231,197, filed Apr. 15, 2021.

\* cited by examiner

*Primary Examiner* — Eric Cardwell
(74) *Attorney, Agent, or Firm* — Muirhead and Saturnelli, LLC

(57) ABSTRACT

A protocol for processing write operations may include recording each write operation in a log using a PDESC(page descriptor)-PB(page block) pair. The protocol may be a data commit sequence that assigns ownership to containers of logged writes. Each container may be associated with a particular logical block address (LBA) range of a logical device, where logged writes that write to target addresses in the particular LBA range of the logical device may be included in the container. Ownership of a container may be determined by the initial write operation that is mapped to, and placed into, the container based on the target logical address of the write operation. A container may be allocated in response to the initial write operation of the container. Multiple nodes may independently flush containers of logged operations based on the particular node designated as the current owner of the containers.

19 Claims, 13 Drawing Sheets

CONTAINER OWNERSHIP PROTOCOL FOR INDEPENDENT NODE FLUSHING

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing operations comprising: receiving a write operation at a first node of a data storage system, wherein the write operation writes first data to a target logical address, wherein the data storage system includes the first node and a second node, wherein the first node includes a first flushing working set (FWS) and a first set of page descriptors (PDESCs) corresponding to recorded operations in a log, and wherein the second node includes a second FWS and a second set of PDESCs corresponding to the recorded operations in the log, wherein each of the recorded operations in the log is described by a PDESC-page block (PB) pair in the log; and performing first processing to record the write operation as a first PDESC-PB pair in a log, wherein the first processing includes: storing, by the first node, the first data in a first PB of the first PDESC-PB pair; determining by the first node that the target logical address of the write operation is included in a first logical block address (LBA) range and that the first FWS of the first node does not include a first instance of a first container associated with the first LBA range thereby indicating that the write operation is an initial write to the first instance of the first container of the first FWS; responsive to determining that the target logical address of the write operation is included in the first LBA range and that the first FWS of the first node does not include the first instance of the first container associated with the first LBA range, allocating the first instance of the first container in the first FWS and assigning none as a current owner of the first instance of the first container of the first FWS; sending, from the first node to the second node, a message requesting that the second node perform second processing in connection with servicing the write operation; receiving, at the first node from the second node, a response to the message, wherein the response indicates a current owner of the first container; assigning the current owner of the first container as indicated in the response as the current owner of the first instance of the first container of the first FWS; and adding a first PDESC of the first PDESC-PB pair for the write operation to the first instance of the first container of the first FWS.

In at least one embodiment, the second processing performed by the second node may include: storing a first PDESC of the first PDESC-PB pair in the log, wherein the first PDESC includes the target logical address and references the first PB; determining whether the second FWS includes a second instance of the first container; responsive to determining the second FWS does not include the second instance of the first container, performing third processing including allocating the second instance of the first container of the FWS; adding the first PDESC to the second instance of the first container of the FWS; and returning the response to the first node, wherein the response indicates that the current owner of the first container is the first node.

In at least one embodiment, the second processing performed by the second node may further include: responsive to determining the second FWS does include the second instance of the first container, performing fourth processing. The fourth processing may include: determining whether a current owner of the second instance of the first container of the second FWS is none; and responsive to determining the current owner of the second instance of the first container of the second FWS is none, setting the current owner of the second instance of the first container of the second FWS to one of the first node and the second node selected in accordance with a deterministic function, and returning the response to the first node, wherein the response indicates that the current owner of the first container is the current owner of the second instance of the first container of the second FWS selected in accordance with the deterministic function. The fourth processing may further include: responsive to determining the current owner of the second instance of the first container of the second FWS is not none, performing fifth processing comprising: adding the first PDESC of the first PDESC-PB pair to the second instance of the first container of the second FWS of the second node; and returning the response to the first node, wherein the response indicates that the current owner of the first container is the current owner of the second instance of the first container of the second FWS of the second node.

In at least one embodiment, a metadata (MD) structure of mapping information may be used to map logical addresses to corresponding physical storage locations including content stored at the logical addresses. The MD structure may include a plurality of levels of MD pages. The first container may be one of a plurality of containers, and each of the plurality of containers may be associated with a different MD page of the MD structure. The MD structure may be a hierarchical structure including a plurality of MD leaf pages each associated with a range of logical block addresses (LBAs) of a logical device. Each MD leaf page associated with the range of LBAs may be used in mapping logical addresses included in the range of LBAs of the logical device to corresponding physical storage locations, and wherein each of the plurality of containers may be associated with one of the plurality of MD leaf pages.

In at least one embodiment, the first container may be associated with a first MD leaf page of the plurality of MD leaf pages. The first MD leaf page may be used in connection with mapping logical addresses included in a first LBA range of a first logical device to corresponding physical storage locations. The instance of the first container of the first FWS of the first node and the second instance of the first container of the second FWS of the second node may each include PDESCs of the log for recorded write operations that write data to target logical addresses included in the first LBA range of the first logical device.

In at least one embodiment, the deterministic function may determine ownership of a particular container in accordance with a particular one of the plurality of MD leaf pages associated with the particular container. Each of the plurality of MD leaf pages may have an associated unique identifier uniquely identifying each of the plurality of MD leaf pages. Each of the plurality of MD leaf pages may be assigned a unique identifier that is an integer. If the particular container is associated with the particular one of the plurality of MD leaf pages having a unique identifier that is an even integer, the deterministic function may assign the first node as a current owner of the particular container, and otherwise the function may assign the second node as the current owner of the particular container.

In at least one embodiment, processing may include flushing the log. Flushing the log may include a first code entity executing on the first node flushing a first set of one or more instances of containers of the first FWS of the first node, wherein each instance of a container in the first set has the first node assigned as current owner of said each instance. Flushing the log may include a second code entity executing on the second node flushing a second set of one or more instances of containers of the second FWS of the second node, wherein each instance of a container in the second set has the second node assigned as current owner of said each instance. Any instance of a container in the first FWS having a current owner of none may not be flushed from the log, and any instance of a container in the second FWS having a current owner of none may not be flushed from the log.

In at least one embodiment, the write operation may write to a logical device, wherein the write operation may be sent by a host to the first node of the data storage system over a first path. The logical device may be exposed to the host over a first plurality of paths, including the first path, from the first node of the data storage system. The logical device may be exposed to the host over a second plurality of paths from the second node of the data storage system, wherein at least the first path of the first plurality of paths may have an associated access state of preferred or active optimized. The second plurality of paths from the second node to the host may have an associated access state of non-preferred or active non-optimized. The host may send I/Os directed to the logical device over any path of the first plurality of paths and the second plurality of paths having an associated access state of preferred or active optimized. The host may only send I/Os directed to the logical device over any path of the first plurality of paths and the second plurality of paths having an associated access state of non-preferred or active non-optimized when there is no path in the first plurality of paths and the second plurality of paths that is preferred or active optimized.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
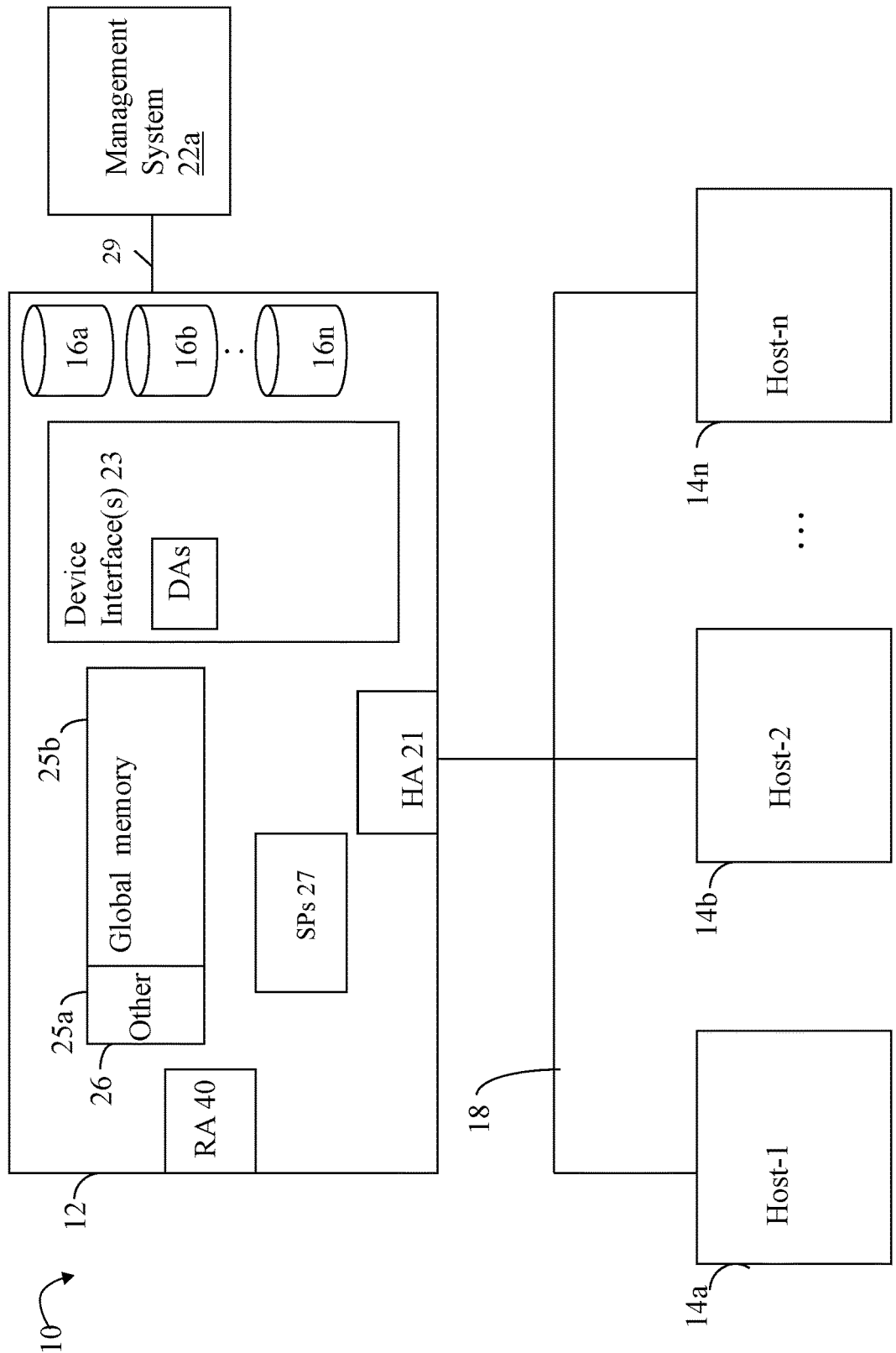
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage system configuration such as LUNs, groups of LUNs, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

In some embodiments, each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target logical address from which data is read from, or written to, depending on whether the I/O operation is, respectively, a read or a write operation request. The target logical address of the received I/O operation may be expressed in terms of a LUN and logical address or offset location (e.g., LBA or logical block address) on the LUN. Processing may be performed on the data storage system to further map the target logical address of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
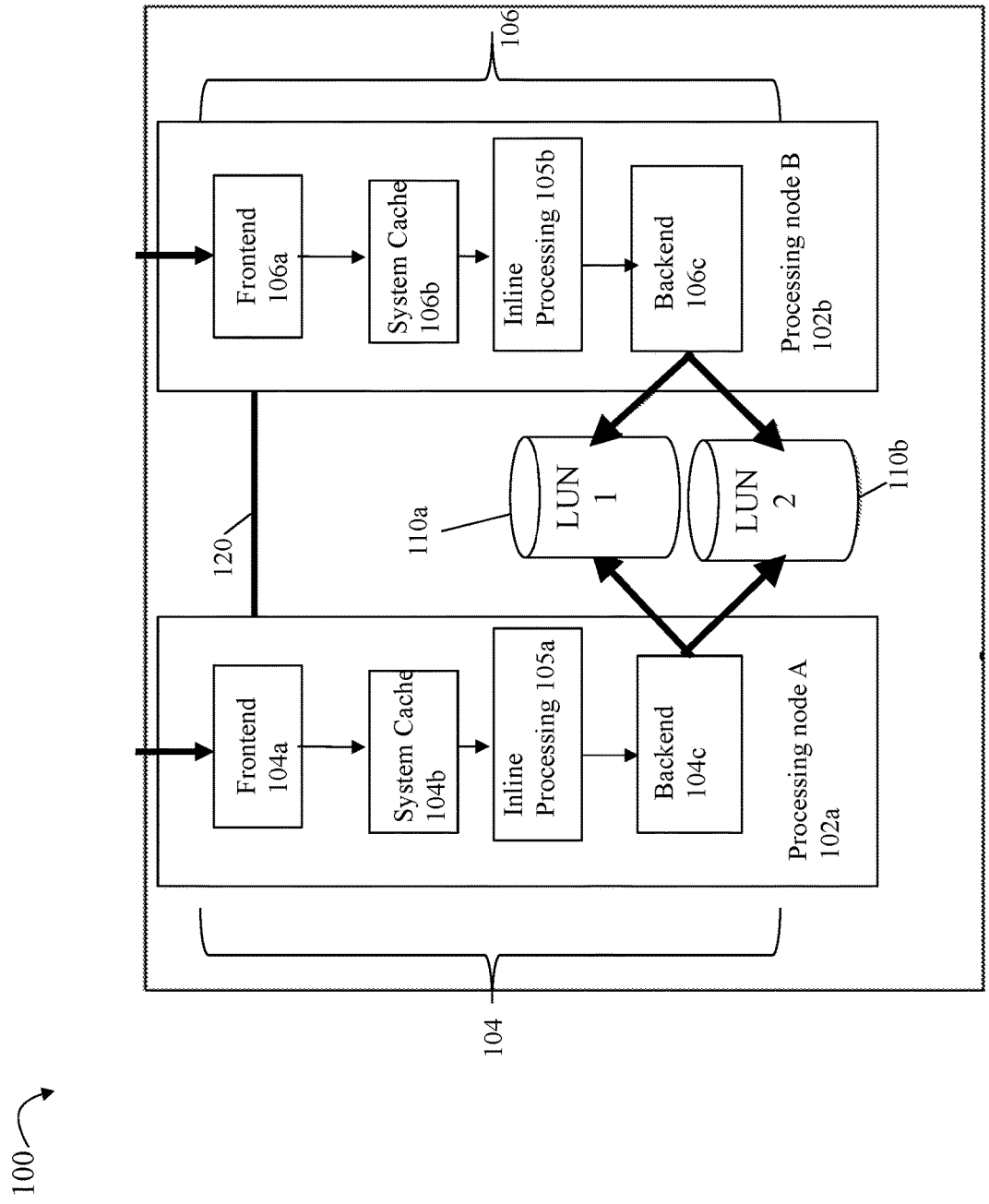
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* may be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 may be used for internode communication between the nodes 102*a*, 102*b*.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105*a*, 105*b* as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102*a-b* in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102*a* is the peer node of the node B 102*b*, and the node B 102*b* is the peer node of the node A 102*a*.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Thus, in such an embodiment, rather than have dedicated hardware for an FA, DA, and the like, the components described above for the FA, DA, RA, and the like, may be viewed as logical or functional components where the tasks of such components may be implemented by code executed by processors of the nodes as illustrated in FIG. 2. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache may be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs provides a persistent cache that may be referred to as a data journal, log or log tier used in the data storage system. In such a system, the caching devices or PDs are non-volatile log devices or PDs upon which the log is persistently stored. In at least one embodiment, in addition to such a persistently stored log, one or more of the nodes may also include node-local in-memory copies of information of the log. In at least one embodiment, the node-local in-memory copies of information of the log stored on each node may be stored in volatile memory, such as a RAM, that is local to the node and may be accessed only within the node. For example, a process or thread of code executing on a core or processor of the node may access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log may be used to optimize write operation latency. Generally, the write operation writing data is received by the data storage system from a host or other client. The data storage system then performs processing to persistently record the write operation in the log. Once the write operation is persistently recorded in the log, the data storage system may send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed may now be reclaimed for reuse. The write operation may be recorded in the log in any suitable manner and may include, for example, recording a target logical address to which the write operation is directed and recording the data written to the target logical address by the write operation.

In the log, each logged operation may be recorded in the next logically sequential record of the log. For example, a logged write I/O and write data (e.g., write I/O payload) may be recorded in a next logically sequential record of the log. The log may be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data may also be read from the log as needed (e.g., depending on the particular use or application of the log) so typical I/O patterns may also include reads. The log may have a physical storage layout corresponding to the sequential and contiguous order in which the data is written to the log. Thus, the log data may be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
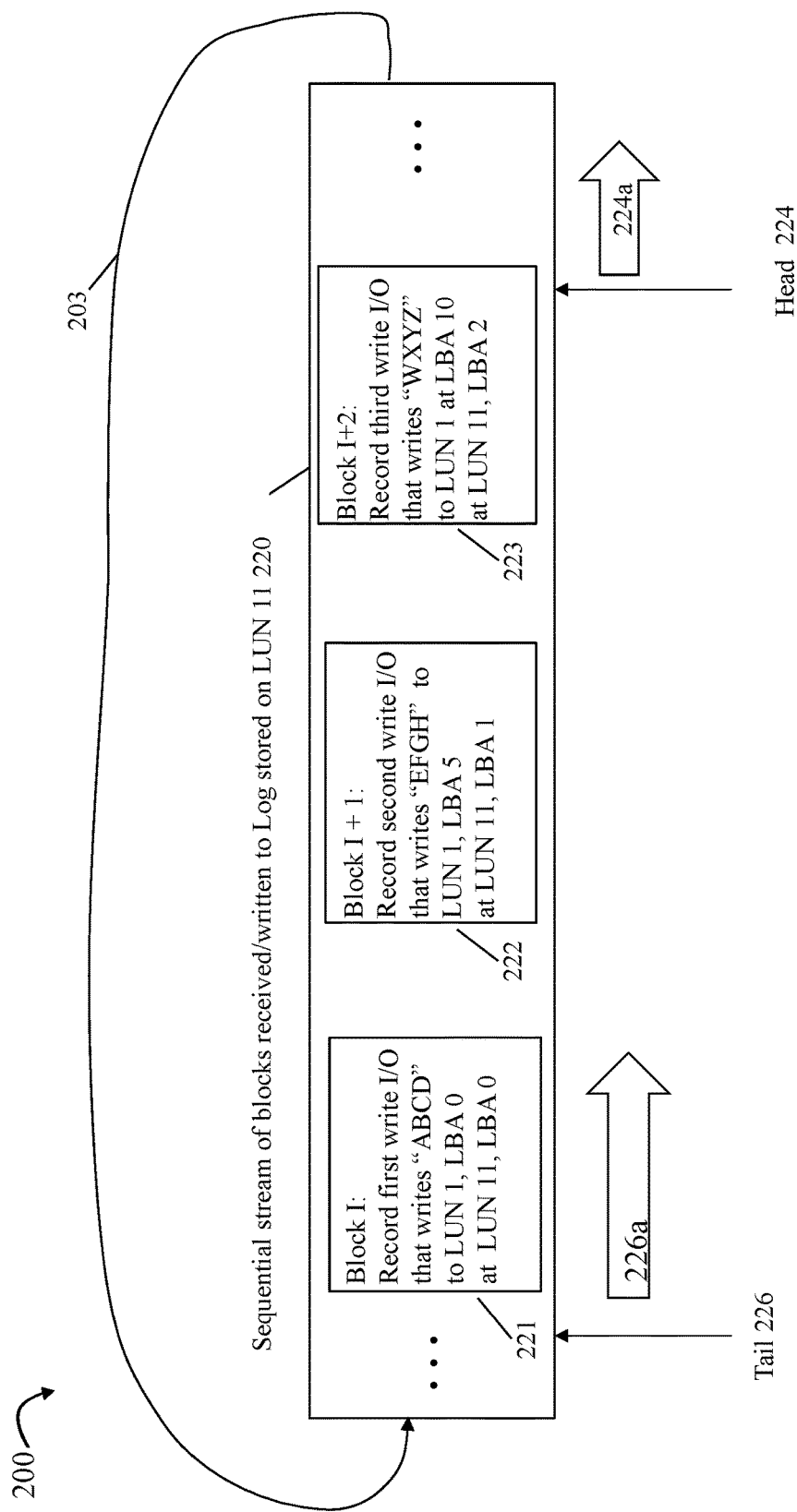
FIGS. 3, 4, 5 and 6 are examples illustrating use of a log structured system in an embodiment in accordance with the techniques herein.

Referring to FIG. 3, shown is an example 200 illustrating a sequential stream 220 of operations or requests received that are written to a log in an embodiment in accordance with techniques herein. In this example, the log may be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 may be written sequentially in the foregoing order for processing in the data storage system. The block 221 may correspond to the record or block I of the log stored at LUN 11, LBA 0 that logs a first write I/O operation. The first write I/O operation may write "ABCD" to the target logical address LUN 1, LBA 0. The block 222 may correspond to the record or block I+1 of the log stored at LUN 11, LBA 1 that logs a second write I/O operation. The second write I/O operation may write "EFGH" to the target logical address LUN 1, LBA 5. The block 223 may correspond to the record or block I+2 of the log stored at LUN 11, LBA 2 that logs a third write I/O operation. The third write I/O operation may write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log may include the target logical address to which data is written and the write data written to the target logical address.

The head pointer 224 may denote the next free record or block of the log used to record or log the next write I/O operation. The head pointer may be advanced 224a to the next record or log in the log as each next write I/O operation is recorded. When the head pointer 224 reaches the end of the log by writing to the last sequential block or record of the log, the head pointer may advance 203 to the first sequential block or record of the log in a circular manner and continue processing. The tail pointer 226 may denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 may logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer may advance 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and may be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata that may be updated as part of the flushing process for the target logical address of the write I/O operation may include mapping information as described elsewhere herein. The mapping information of the metadata for the target logical address may identify the physical address or location on provisioned physical storage on a non-volatile BE PD storing the data of the target logical address. The target logical address may be, for example, a logical address on a logical device, such as a LUN and offset or LBA on the LUN.

Figure 4:
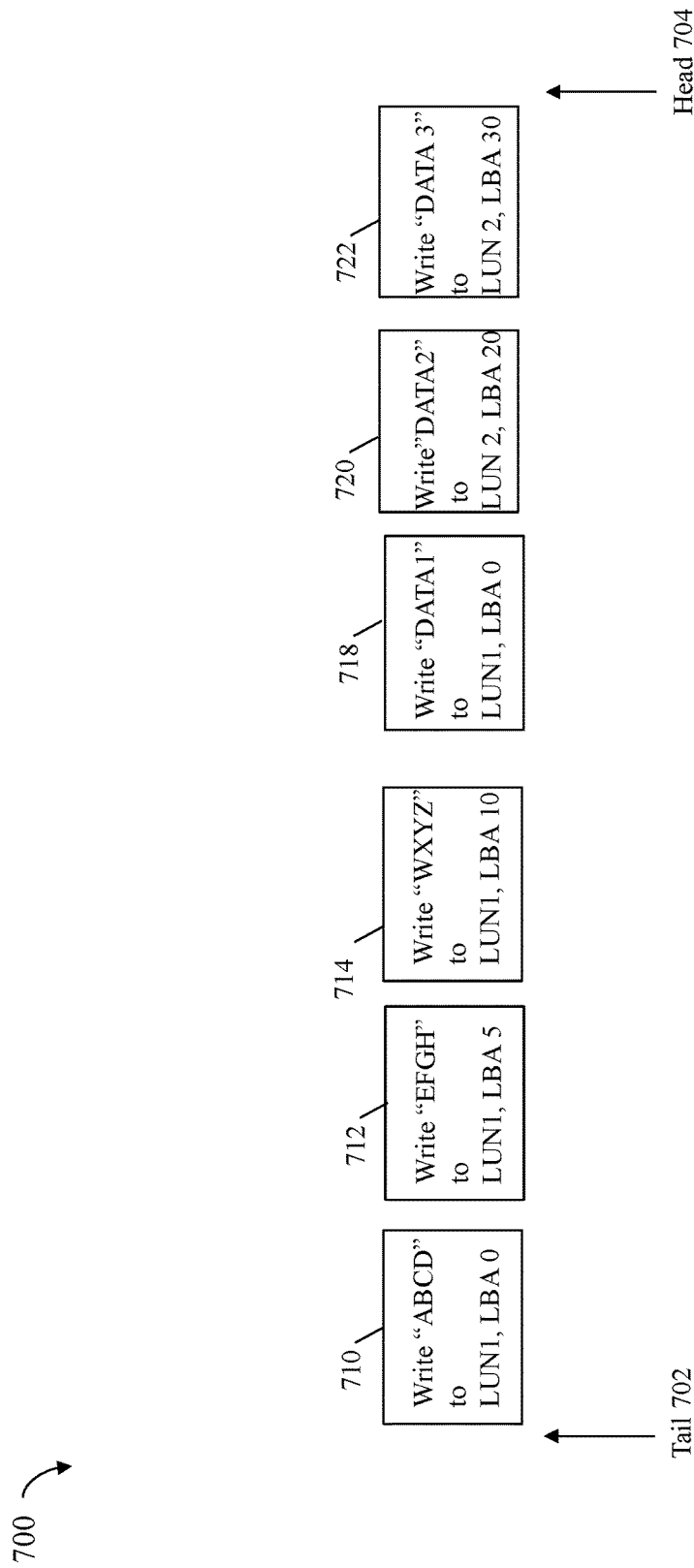

Referring to FIG. 4, shown is an example of information that may be included in a log in an embodiment in accordance with the techniques herein.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 may also record the write data (e.g., write I/O operation payload) written by the write operations. It should be noted that the log records 710, 712 and 714 of FIG. 4 correspond respectively to the log records 221, 222 and 223 of FIG. 3.

The log may be flushed sequentially or in any suitable manner to maintain desired data consistency. In order to maintain data consistency when flushing the log, constraints may be placed on an order in which the records of the log are flushed or logically applied to the stored data while still allowing any desired optimizations. In some embodiments, portions of the log may be flushed in parallel in accordance with any necessary constraints needed in order to maintain data consistency. Such constraints may consider any possible data dependencies between logged writes (e.g., two logged writes that write to the same logical address) and other logged operations in order to ensure write order consistency.

Figure 5:
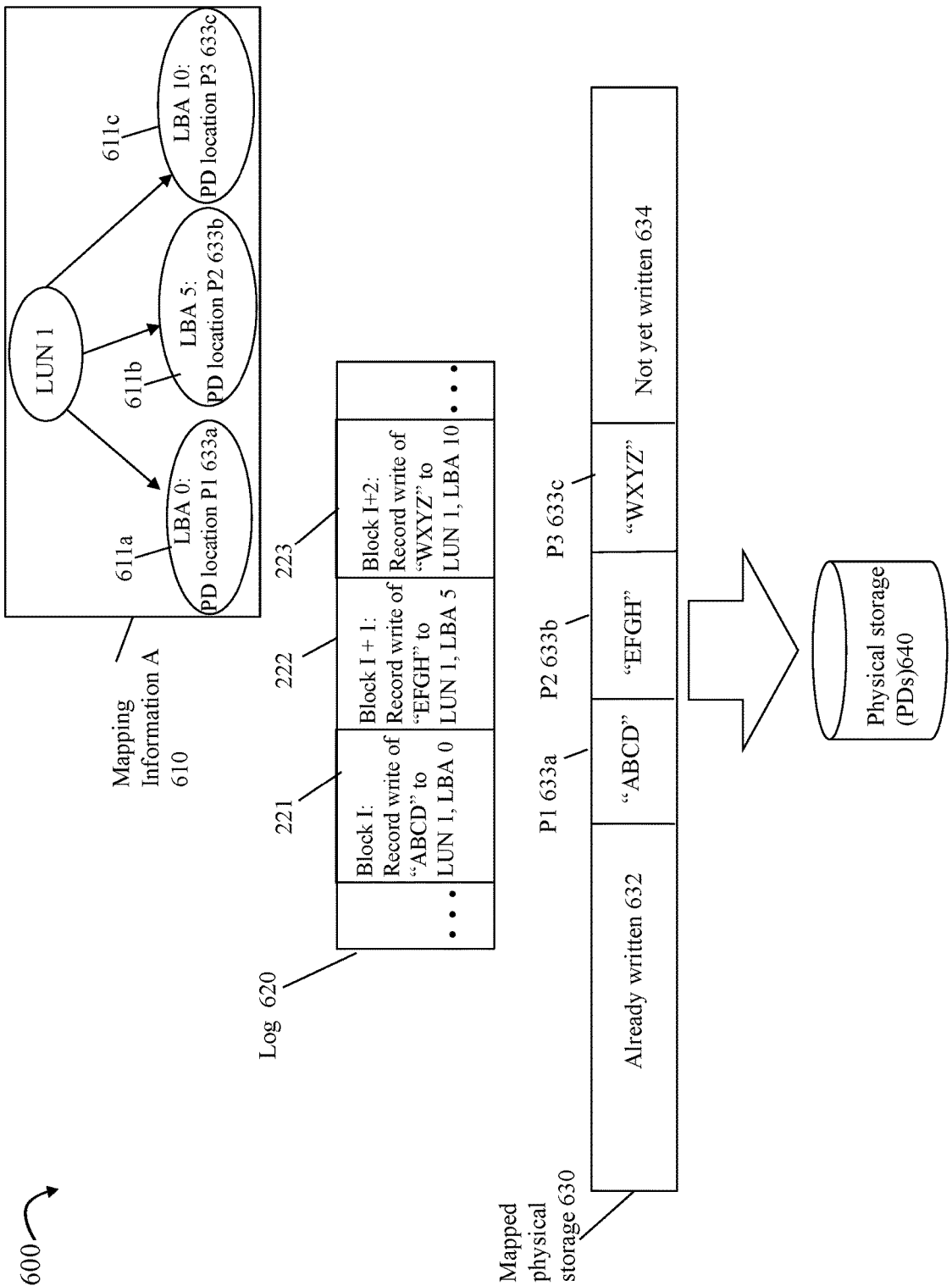

Referring to FIG. 5, shown is an example 600 illustrating the flushing of logged writes and the physical data layout of user data on BE PDs in at least one embodiment in accordance with the techniques herein. FIG. 5 includes the log 620, the mapping information A 610, and the physical storage (i.e., BE PDs) 640. The element 630 represents the physical layout of the user data as stored on the physical storage 640. The element 610 may represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data may be stored and written to the physical storage 640 as the log records or blocks are flushed. In this example, the records of the log 620 may be flushed and processing sequentially (e.g., such as described in connection with FIG. 3) and the user data of the logged writes may be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses may be updated. The user data of the logged writes may be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage may also be physically sequential and contiguous where the non-volatile storage used for the log may be viewed logically as one large log having data that is laid out sequentially in the order it is written to the log.

The data layout of the user data as stored on the BE PDs may also be physically sequential and contiguous. As log records of the log 620 are flushed, the user data written by each flushed log record may be stored at the next sequential physical location on the BE PDs. Thus, flushing the log may result in writing user data pages or blocks to sequential consecutive physical locations on the BE PDs. In some embodiments, multiple logged writes may be flushed in parallel as a larger chunk to the next sequential chunk or portion of the mapped physical storage 630.

Consistent with other discussion herein, the mapped physical storage 630 may correspond to the BE PDs providing BE non-volatile storage that may be used for persistently storing user data as well as metadata, such as the mapping information. With a log-structured system as discussed herein, as recorded writes in the log are processed, the data written by the writes may be written to new physical storage locations on the BE PDs.

Figure 6:
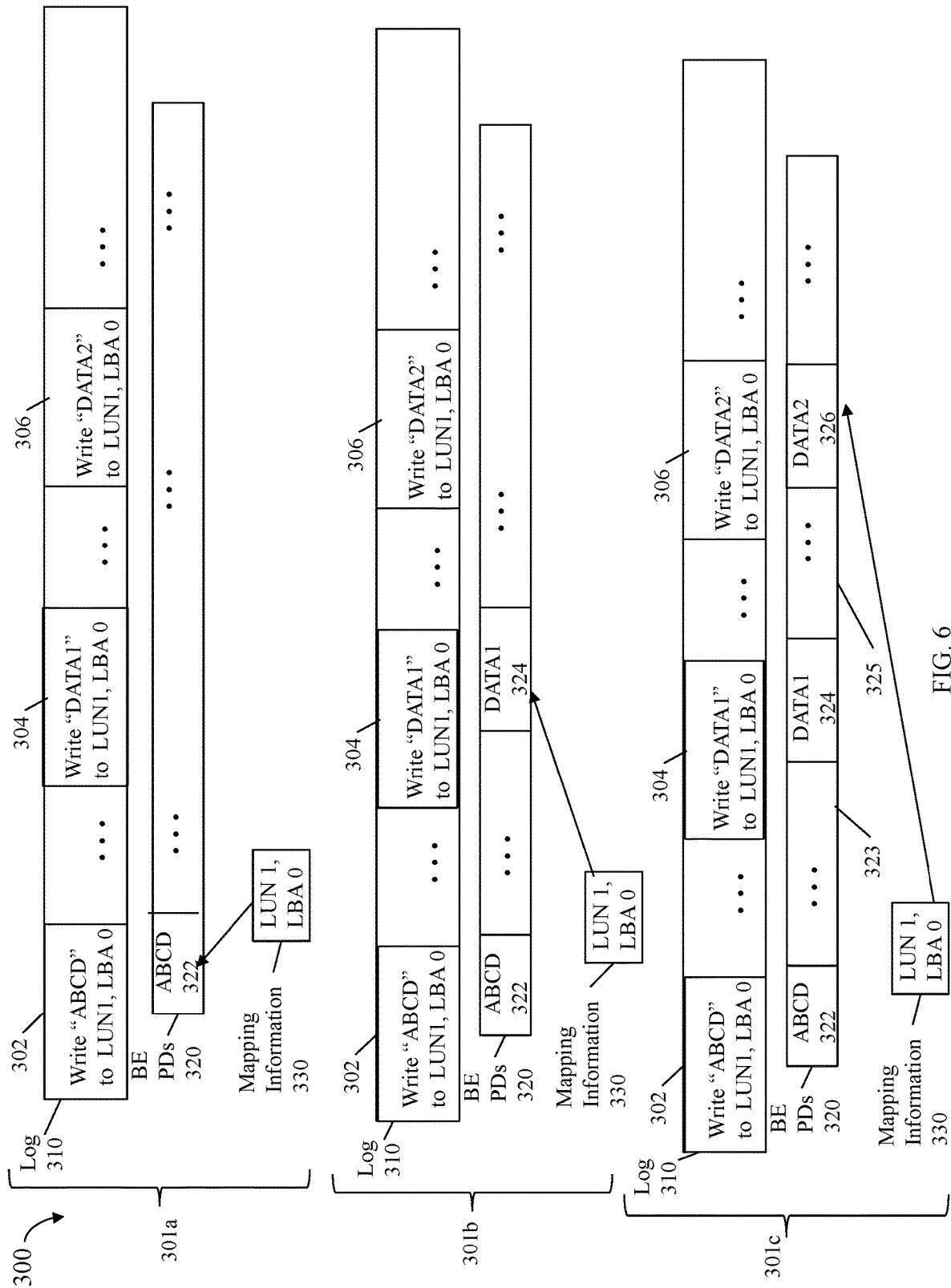

For example with reference to FIG. 6, the element 301a may denote the state of the log file 310, BE PDs 320 and mapping information 330 at a first point in time T1 after processing the record 302 for a first write of "ABCD" to the logical address LUN A, LBA 0. The data written "ABCD" by the recorded write of 302 may be stored at the BE PD location 322. Thus, flushing the log record 302 results in storing the write data "ABCD" to the BE PD location 322 and additionally updating the mapping information 330 to reference the BE PD location 322. The mapping information 330 denotes the metadata used to map the logical address LUN 1, LBA 0 to the current physical location on the BE PDs containing the user data or content stored at the logical address LUN 1, LBA 0. After the log record 302 is flushed from the log 310, the record 302 is available and may be subsequently reclaimed for reuse for logging other operations in the log 310.

At a second point in time T2 subsequent to T1, the log record 304 may be processed and flushed to the BE PDs 320. The element 301b denotes the state of the log file 310, BE PDs 320 and mapping information 330 at the second point in time T2 after processing the record 304 for a second write of "DATA1" to the logical address LUN A, LBA 0. The data written "DATA1" by the recorded write of 304 may be stored at the BE PD location 324. Thus, flushing the log record 304 results in storing the write data "DATA1" to the BE PD location 324 and additionally updating the mapping information 330 to reference the BE PD location 324 denoting the physical location containing the data stored at the LUN 1, LBA 0 at the time T2. Additionally, the PD location 322 may be invalidated since it no longer contains valid current data for the logical address LUN 1, LBA 0, whereby the PD location 322 may be available for reuse. After the log record 304 is flushed from the log 310, the record 304 is available and may be subsequently reclaimed for reuse for logging other operations in the log 310.

At a third point in time T3 subsequent to T2, the log record 306 may be processed and flushed to the BE PDs 320. The element 301c denotes the state of the log file 310, BE PDs 320 and mapping information 330 at the third point in time T3 after processing the record 306 for a third write of "DATA2" to the logical address LUN A, LBA 0. The data written "DATA2" by the recorded write of 306 may be stored at the BE PD location 326. Thus, flushing the log record 306 results in storing the write data "DATA2" to the BE PD location 326 and additionally updating the mapping information 330 to reference the BE PD location 326 denoting the physical location containing the data stored at the LUN 1, LBA 0 at the time T3. Additionally, the PD location 324 may be invalidated since it no longer contains valid current data for the logical address LUN 1, LBA 0, whereby the PD location 324 may be available for reuse. After the log record 306 is flushed from the log 310, the record 306 is available and may be subsequently reclaimed for reuse for logging other operations in the log 310.

In at least one embodiment with a dual node appliance or data storage system such as illustrated in FIG. 2, one of the two nodes may be designated as the primary node with the other peer node designated as the secondary or non primary peer node.

Flushing of the log may be performed by multiple worker threads or processes running on both the primary node and also the secondary or non-primary node. In at least one existing system, a single instance of the flush manager running on only the primary node may perform processing to control the flushing of the log. For example, the flush manager on the primary node may perform processing to coordinate and distribute flushing of portions of the log file among multiple worker threads executing on both nodes of the cluster.

The flush manager may periodically monitor the amount of consumed and/or free space in the log. In response to determining that the amount of consumed space of the log exceed a threshold, such as 70%, the flush manager may perform processing to flush existing logged operations to the BE PDs providing the non-volatile storage. The flush manager may, for example, select a particular node to flush a particular portion of the log. The flush manager may, for example, sort and aggregate together into a working set those multiple log records to be flushed together by a single worker thread or process. Thus, the flush manager executing on only the primary node may build multiple working sets of log records to be flushed and then distribute the workings sets among the two nodes for flushing. The flush manager may assign each of the working sets to a selected node for flushing in any suitable manner.

Using the single instance of the flush manager on the primary node to perform flushing has multiple drawbacks. For example, use of the single flush manager executing on only the primary node introduces node asymmetry in a multiple node system and introduces additional load and dependencies on the single one of the nodes designated as the primary node. If the primary node is busy performing other processing, the flush manager processing may be blocked resulting in no flushing of the log and no reclamation of log space for reuse. Furthermore, additional internode communication is required to coordinate and orchestrate the flushing between the two nodes.

Described in the following paragraphs are techniques for efficient flushing of the log which overcomes the above-noted drawbacks. The techniques described in the following paragraphs provide for efficient independent node flushing without having a flush manager. In at least one embodiment, a concept of ownership is applied to a container of logged records or operations. The container may be generally characterized as a logical grouping of a portion of log records or operations of the log. Each container of log records or operations may be assigned an owner that is one of the nodes in the system. The owner of a container is the designated node that is responsible for flushing any log records of the container. The techniques herein provide for a consistent and synchronized view among the two nodes of the system of ownership of the various containers of log records. Such a synchronized view of container ownership avoids, for example, concurrent flushing of the same container by both nodes of the system.

In at least one embodiment in accordance with the techniques herein, data locality and expected cache locality may be considered as optimizations to provide for efficient flushing of the log. In at least one embodiment, each container may include log records for write operations that write data to a specified range of target addresses or locations. For example, each container may be associated with a particular portion or range of LBAs of a particular LUN so that a logged write operation that writes data to a target address falling into the associated range of the container may be included in the container. In this manner, at least one embodiment of the techniques herein provides for data flushing of the log while taking into account data locality so that user data pages related to the same LBA range may be preferably flushed together. In at least one embodiment, log records associated with the same metadata (MD) leaf page (in some contexts also referred to as MD leaf) may be included in the same container and flushed together. The MD leaf may be a particular page of MD included in the mapping information as discussed elsewhere herein that maps a logical address, such as a LUN and LBA of the LUN, to a corresponding physical storage location storing the content or data of the logical address. The physical storage location may be on a BE PD providing non-volatile storage for the logical address.

In at least one embodiment, expected cache locality may also be considered in that the owner or owning node of a container that is responsible for flushing the log records of the container may be the node that receives the write operations recorded by the log records of the container. In at least one embodiment, I/O operations directed to a particular LUN or volume may be received by a specified one of the nodes. In such an embodiment, access path states from hosts to the nodes of the data storage system or appliance may be set and communicated to the hosts. With respect to I/Os directed to a particular LUN or volume, the access path states may indicate to the host the particular one or more preferred paths to a particular node to be used when sending the I/Os from the host to the data storage system.

In at least one embodiment, the access path states may be in accordance with a standard or protocol such as the SCSI Asymmetrical Logical Unit Access (ALUA) standard. The ALUA standard specifies a mechanism for asymmetric or symmetric access of a volume or LUN as used herein. ALUA allows the data storage system to set a LUN's access state with respect to a particular initiator port and the target port. Thus, in accordance with the ALUA standard, various access states (also sometimes referred to herein as ALUA states or path states) may be associated with a path with respect to a particular device, such as a LUN. In particular, the ALUA standard defines such access states including the active-optimized (sometimes referred to herein as preferred), active-non optimized (sometimes referred to herein as non-preferred), and unavailable states as described herein. In at least one embodiment, ALUA path states for a particular LUN accessed over particular target ports of one node of the system may be set to active-optimized or preferred while setting ALUA path states for a particular LUN accessed over particular target ports of the second remaining node of the system may be set to active non optimized or non-preferred. The host may send I/Os directed to the LUN over paths to a single one of the nodes designated as active optimized or preferred. In this manner, I/Os directed to the particular LUN may be sent to a single node of the system.

In at least one embodiment, ownership of a container may be dynamic and determined by the initial or first (e.g., in time) ingestion of a write operation directed to an LBA falling into the LBA range associated with the container. An ingestion of a write operation may refer to the process of servicing a received write operation by a node. In at least one embodiment in accordance with the ALUA standard with respect to a particular volume or LUN, paths to only one of the nodes of the system may be designated as active optimized or preferred so that all I/Os directed to the particular volume are LUN may be expected to be received at only the one node of the system. In such an embodiment, the one node of the system may receive the initial write to a container having an LBA range associated with the LUN where the one node may be designated as the owner of the container. In such an embodiment, the one node designated as the owner of the container may be expected to receive write I/Os directed to the LUN and may therefore likely have in its node local volatile memory a copy of the data written by the write I/Os directed to the LUN, where such write I/Os may be recorded as log records of the container owned by the one node.

In at least one embodiment, maintaining the dynamic ownership aspect of containers of log records is performed using efficient internode synchronization that does not introduce undesirable additional internode communications.

In at least one embodiment, the techniques provide for independent node flushing without having a single component responsible for orchestrating and distributing the log records for flushing. In at least one embodiment, the one or more hosts and the data storage system may operate in accordance with the ALUA standard. In such an embodiment operating in accordance with the ALUA standard, logged write operations may be flushed from the log by the node that receives the write operations where the data written by the logged write operations may likely be in the volatile memory cache of the node.

The foregoing and other aspects of the techniques herein are described in more detail in illustrative examples in the following paragraphs.

In embodiments in accordance with the techniques herein, write operations may be recorded in the log using different object types or structure. A first structure of the log may include records of the data written by the received write operations, and a second structure of the log may include records that are descriptors for the received write operations. For example, the write operation data may be stored in a record of the first structure in the log. Additionally, a descriptor for the write operation may be stored in a record of the second structure in the log, where the descriptor may reference a record in the first structure including the write data written by the write operation. In at least one embodiment, both the first structure and the second structure may be ring buffers. Ring buffers are generally known in the art. A ring buffer is a ring of records or entries. The ring buffer may be maintained using pointers, such as a head pointer and a tail pointer, where new entries of the ring may always be allocated from the head and space reclamation may always be done from the tail. When an entry at the tail is flushed, the entry may be freed and thus reclaimed for reuse. The tail may be advanced as entries are flushed. In a similar manner, as entries are allocated, the head pointer is advanced.

Figure 7:
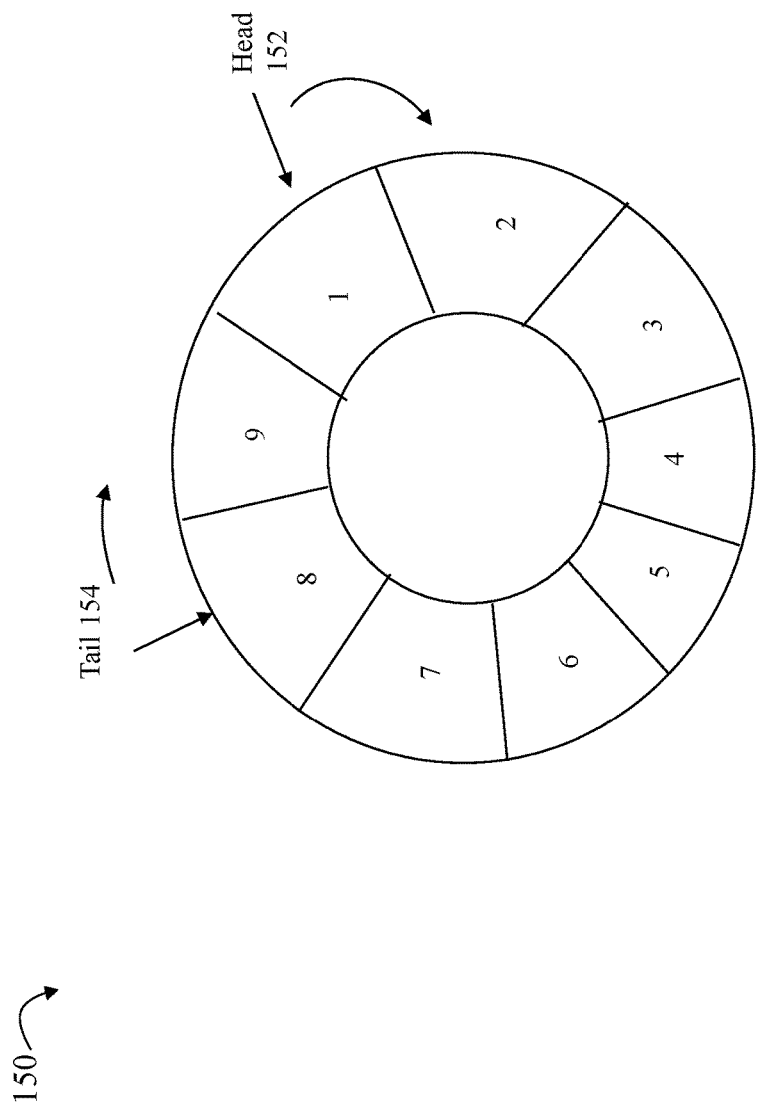
FIG. 7 is an example of a ring buffer structure that may be used in an embodiment in accordance with the techniques herein.

Referring to FIG. 7, shown is an example 150 illustrating a ring buffer. The ring buffer 150 may be managed using the head pointer 152 and the tail pointer 154. Both pointers are advanced in the clockwise flow in this example. Entries are allocated from the head of the list as denoted by the head pointer 152. For example, the entry 1 may be allocated by the head pointer 152. Subsequently, the head pointer 152 is advanced to the entry 2 since entry 2 is the next entry to be allocated when needed. The tail pointer 154 may denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer may look the same where the head pointer 152 and the tail pointer are equal or point to the same entry in the ring buffer. In the full case, all entries in the ring buffer are allocated and in the empty case, all entries in the ring buffer are free or available for use. Any suitable technique may be used to distinguish between the full and empty ring buffer cases when the head pointer and the tail pointer point to the same entry. For example, a count may be maintained for the ring buffer denoting the number of allocated entries. The count may be initialized to 0, incremented each time an entry is allocated by the head pointer advancing, and decremented each time an entry is flushed and reclaimed by advancing the tail pointer.

In at least one embodiment, the ring buffer may be implemented using an array where, for example, the entries 1 through 9 as in FIG. 7 correspond to array indices. The circular nature of the ring buffer may be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 7.

In at least one embodiment, both the first structure of logged data and the second structure of logged descriptors may be implemented as ring buffers. For example, the first structure may be a first ring buffer of page blocks (PBs) where each PB includes the write data of a single logged write. The second structure may be a second ring buffer of page descriptors (PDESCs) where each PDESC includes a descriptor of a single logged request such as a write operation. For a write operation that writes data, the logged write operation may be described by a PDESC of the log, the data written may be stored in a PB of the log, and the PDESC of the log may include a reference to the PB containing the data written. In some systems, requests or operations in addition to write operations may be recorded in the log using PDESCs where such PDESCs of these additional requests or operations may not have an associated PB.

In at least one embodiment, the size of each PB may generally be much larger than each PDESC. For example, in at least one embodiment, each PB may be 4K bytes or 8K bytes in size, and each PDESC may be ½ Kbyte or smaller. Thus generally, the total amount of storage used for the PBs of the log is much greater than the total amount of storage used for the PDESCs of the log.

It should be noted that the flushing of the log may be performed in response to an occurrence of any one or more defined conditions. For example, the log may be flushed in response to determining that the amount of reclaimed log space available for use and allocation is less than a specified threshold amount or size. As another example, the log may be flushed in response to determining that the amount of reclaimed PB space available for use and allocation is less than a specified threshold amount or size. As another example, the log may be flushed in response to determining that the amount of reclaimed PDESC space available for use and allocation is less than a specified threshold amount or size.

In at least one embodiment, the process of flushing the log includes flushing PDESCs of the second ring buffer and associated PBs of the first ring buffer. In such an existing system, PDESC-PB pairs may be flushed, where each PDESC-PD pair denotes a logged write operation, and the PDESC of the pair points to or references the PB of the same pair. Multiple PDESC-PB pairs may be aggregated and flushed as a working set or unit. The particular PDESC-PB pairs flushed in the same working set or unit may be based on an application locality policy. For example, multiple PDESC-PB pairs included in the same working set may be flushed together where the PDESC-PB pairs of the working set write data to related logical addresses, such as LBAs of a LUN within the same logical address subrange. In some systems, multiple working sets of PDESC-PB pairs may be flushed in parallel by different flusher threads or processes of one or more nodes of the data storage system. As each PDESC-PB pair is flushed from the log to the BE PDs, the log space associated with the flushed PDESC and PB may be freed and reclaimed for reuse.

As a variation, in at least one embodiment, the PBs may be implemented using a pool of PBs that are not organized and maintained as a ring buffer. In such an embodiment, the PBs may be organized and maintained as a pool while the PDESCs may be organized and maintained as a ring buffer.

In at least one embodiment, the PDESC ring or ring buffer may be implemented as an array or linked list where each PDESC entry in the ring buffer may have an associated sequence number or identifier. Unique monotonically increasing sequence numbers or identifiers may be assigned to PDESC entries as they are used to log operations, such as write operations. The sequence numbers may denote the time dependent ordering of the logged operations or requests. A PDESC that generally references a PB may be referred to as a PDESC-PB pair where the PB of the pair contains the content stored at the logical address included in the PDESC of the pair.

In at least one embodiment, the PB pool may be implemented using an array or linked list of PB entries. In one embodiment, a list of PBs may be denoted as a list of indices associated with the PBs. A bit vector may include a different bit for each PB, where the bit associated with a PB has a value of 1 when the PB is allocated and the bit associated with the PB otherwise has a value of 0 when the PB is unallocated or free. Once a PB is flushed, it may be reclaimed or released immediately by indicating that its associated index or bit in the bit vector denotes the state of unallocated or free (e.g., where the bit is set to 0). Thus, using the PB pool rather than a PB ring buffer has no dependencies, problems or constraints that may occur, for example, due to tail pointer management of the ring buffer. With a PB pool, each PB may be released or reclaimed immediately after the data of the PB has been flushed or destaged to a BE PD.

Before proceeding with further description and considerations of a request processing protocol in an embodiment in accordance with the techniques herein, following is a discussion of additional details regarding use of a metadata (MD) structure of mapping information that may be used in at least one embodiment in accordance with the techniques herein, sequence numbers or identifiers (IDs) that may be used in at least one embodiment in accordance with the techniques herein, the ALUA protocol and standard that may be used in at least one embodiment, and additional information regarding use of PDESCs and PBs for recording operations in the log.

The mapping information may be used to map a logical address, such as a LUN and an LBA or offset, to its corresponding storage location, such as a physical storage location on BE non-volatile PDs of the system. Consistent with discussion elsewhere herein, write requests or operations stored in the log may be flushed to the BE PDs (non-volatile) providing storage locations for the written data. For example, a logged write operation that writes first data to a logical address may be flushed whereby the logged first data is written out to a physical storage location on a BE PD. The mapping information may be used to map the logical address to the physical storage location containing the content or data stored at the logical address. In at least one embodiment, the mapping information may include a MD structure that is hierarchical structure of multiple layers.

Figure 8:
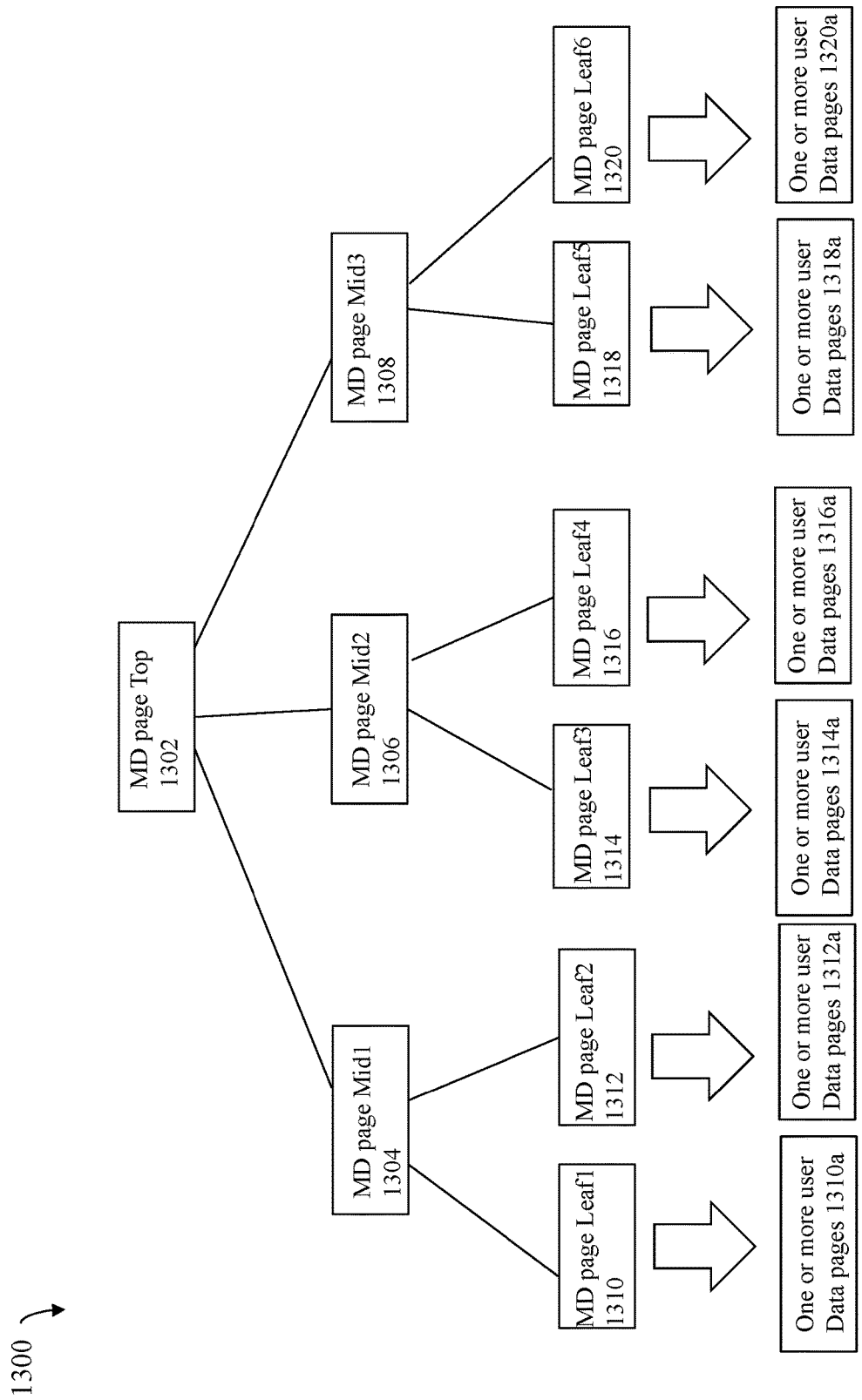
FIG. 8 is an example representation of mapping information of hierarchy of metadata pages that may be used in mapping logical addresses to physical storage locations in an embodiment in accordance with the techniques herein.

In at least one embodiment, the mapping structure for a LUN, such as a LUN A, may be in the form of a tree having a plurality of levels. More generally, the mapping structure may be in the form of any ordered list or hierarchical structure. In at least one embodiment, the mapping structure for the LUN A may include LUN MD in the form of a tree having 3 levels including a single top or root node (TOP node), a single mid-level (MID node) and a bottom level of leaf nodes (LEAF nodes), where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages of the mapping structure for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages, corresponding to the mapping structure in at least one embodiment, is represented in FIG. 8 as including only 3 levels where each node in the tree may have at most 3 child nodes. Generally, the techniques herein may be used with any layered or hierarchical structure of MD pages.

Referring to FIG. 8, shown is an example 1300 of a tree of MD pages that may be used in an embodiment in accordance with the techniques herein. The example 1300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 1300, the top or root level, level 1, includes MD page 1302; the mid or middle level, level 2, includes MD pages 1304, 1306 and 1308; and the bottom level, level 3, includes MD pages 1310, 1312, 1314, 1316, 1318 and 1320, which may also be referred to as leaf nodes. As also illustrated in the example 1300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 1310, 1312, 1314, 1316, 1318 and 1320 point or reference, respectively, one or more UD pages 1310a, 1312a, 1314a, 1316a, 1318a and 1320a.

The links or connections between a parent node (at level M) and its one or more child nodes (at level M+1) in the tree 1300 generally represent mappings between the parent node and the one or more child nodes. In at least one embodiment, the parent node may include a reference used to access (directly or indirectly) each of its one or more child nodes. For example, the root node MD page top 1302 may include addresses or pointers used to access each of its child nodes 1304, 1306 and 1308. The mid-level node MD page mid1 1304 may include addresses or pointers used to access each of its child leaf nodes 1310, 1312. The mid-level node MD page mid1 1306 may include addresses or pointers used to access each of its child leaf nodes 1314, 1316. The mid-level node MD page mid1 1308 may include addresses or pointers used to access each of its child leaf nodes 1318, 1320.

In at least one embodiment, each of the addresses or pointers included in a MD page that references a location in another MD page or references a location in a UD page may be a physical storage location on the back-end PDs. Thus, the traversal between connected nodes of the structure 1300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page or block X is included in the set of UD pages 1312a. In order to access UD page X of 1312a, the following denotes the consecutive serialized order in which the MD pages forming a sequence are accessed: MD page top 1302, MD page mid1 1304, and MD page leaf2 1312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 1302, MD page mid1 1304, and MD page leaf2 1312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 1300 may generally include multiple pointers or references to locations of its child nodes or pages. For example, MD page top 1302 includes pointers to locations of its child nodes, MD pages 1304, 1306 and 1308. MD page mid2 1306 includes pointers to locations of its child nodes, MD pages 1314 and 1316.

The data pages 1310a, 1312a, 1314a, 1316a, 1318a and 1320a include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 8, the data pages 1310a, 1312a, 1314a, 1316a, 1318a and 1320 each include user data stored on particular logical addresses of the LUN A's logical address space. It may be, for example, that element 1310a includes user data stored at a first set of LBAs 0-511; and that element 1312a includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, the element 1310a denotes data pages for LBAs 0-511; the element 1312a denotes data pages for the LBAs 512-1023; the element 1314a denotes data pages for LBAs 1024-1535; the element 1316a denotes data pages for LBAs 1536-2047, and so on.

In at least one embodiment, when the structure 1300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 1302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 1300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 1300 to determine the data block for a particular LUN and LBA. Similarly, it is a straightforward mathematical calculation to determine the index, offset or entry in a particular page or node to be accessed in connection with obtaining data blocks stored at the particular LUN and LBAs of the LUN. Each MD page in 1300 may be known to include MD relevant for accessing data on a particular LUN and one or more LBAs of that LUN. For example, consistent with discussion above, element 310a denotes the data blocks for LBAs 0-511 of a LUN. In order to access the data block for an LBA of the LUN in the LBA subrange 0-511, MD pages 1302, 1304 and 1310 may be traversed in sequential order. In particular, the first entry or offset of the MD page top 1302 may contain the address of the MD page mid 1 1304; the first entry or offset of the MD page mid 1 1304 may contain the address of the MD page leaf 1 1310; and the first entry or offset of the MD page leaf 1 1310 may contain the address of the data blocks for 1310a.

In a similar manner, a mapping may be made regarding what MD pages of the structure 300 and entries thereof are used in connection with obtaining data blocks containing data for any particular LUN and LBA. In at least one embodiment, the particular MD pages used to access a data block including data for a particular LUN and LBA may be known based on such mappings and correspondence of LBA subranges to particular MD leaf pages.

In an embodiment in accordance with the techniques herein for purposes of data integrity and correctness, the time order dependency of the logged data and operations of the log needs to be maintained. The time order is with respect to the relative order in which the operations are to be applied to the stored data of the data storage system to ensure data integrity and correctness. In an active-active system where I/Os may be serviced by both nodes of the dual node system, the time order dependency requirement needs to be maintained and synchronized across both nodes of the system. For example, at a first point in time, the node A may process a first write that is acknowledged to the host as completed. The first write may write first data to a first logical address, where the first write is stored in the log and subsequently flushed to the BE PDs. At a second point in time subsequent to the first point in time, the node A may process a second write that is acknowledged to the host as completed. The second write may write second data to the first logical address where the second write is also stored in the log and subsequently flushed to the BE PDs. When flushing the logged first data of the first write and the logged second data of the second write, the time order dependency or requirement is that the second data of the second write needs to be stored to the physical storage containing the data for the first logical address after the first data in order to ensure that the actual physical storage contains the correct data expected by the host based on the order in which the first and second writes were acknowledged to the host as being applied to the first logical address. Since the second write is acknowledged as successfully complete subsequent to the successful acknowledgement of the first write, the host expects the first logical address to contain the second data written (or overwritten) by the second subsequent write. In at least one system, the time order of logged data and operations may be denoted using global sequence numbers or IDs. Any optimizations performed such as, for example, in connection with parallel flushing must maintain the same resulting data content as described by the time order dependency denoting the logical ordering in which the logged requests or operations are applied.

In one such dual node system in accordance with the techniques herein, one of the two nodes may be designated as the primary node which assigns each logged operation a new unique sequence ID. The sequence ID of the logged requests or operations denote the time dependent order in which such logged requests or operations are logically applied to the stored data on the BE PDs in order to maintain the data integrity and data content and expected by the host or other clients. The order in which the data is flushed from the log to the BE PDs maintains the time order requirement or dependency as denoted by the sequence IDs.

Thus, the designated primary node of the system node pair is designated as the primary node with respect to all write operations and other operations included in the log across all the LUNs configured from storage of the BE PDs accessible by the node pair. The primary node, for example, assigns a unique sequence ID to each write I/O operation having its write data stored in the log. The primary node may assign all the sequence IDs independent of which node receives the write I/O or other operation having corresponding logged data that is subsequently flushed from the log. Thus, the primary node assigns sequence IDs for writes and other commands or operations that are logged, where such writes and other commands are received collectively by both the primary node and the non-primary node of the pair. The sequence IDs assigned establish the time order. In particular, the time order may be denoted by the monotonically increasing sequence IDs assigned to logged request or operation. To illustrate, assume a first sequence ID is assigned to a first write I/O that writes first data, a second sequence ID is assigned to a second write I/O that writes second data, and the first sequence ID is less than the second sequence ID. In this case, the first write I/O and first data occur in the time order sequence prior to the second write I/O and second data, where the first write I/O and the first data are written or applied prior to the second write I/O and the second data. In this manner, the sequence IDs assigned by the primary node are used to establish the time order dependency of all the write I/Os written to all the LUNs configured from storage of the BE PDs where the pair of nodes services all I/Os directed to such LUNs.

In an embodiment described herein, the data storage system may be a SCSI-based system such as SCSI-based data storage array. An embodiment in accordance with the techniques herein may include one or more hosts and one or more data storage systems which operate in accordance with the SCSI ALUA standard. Consistent with other discussion herein, the ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states (also sometimes referred to herein as ALUA states or path states) may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

Figure 9:
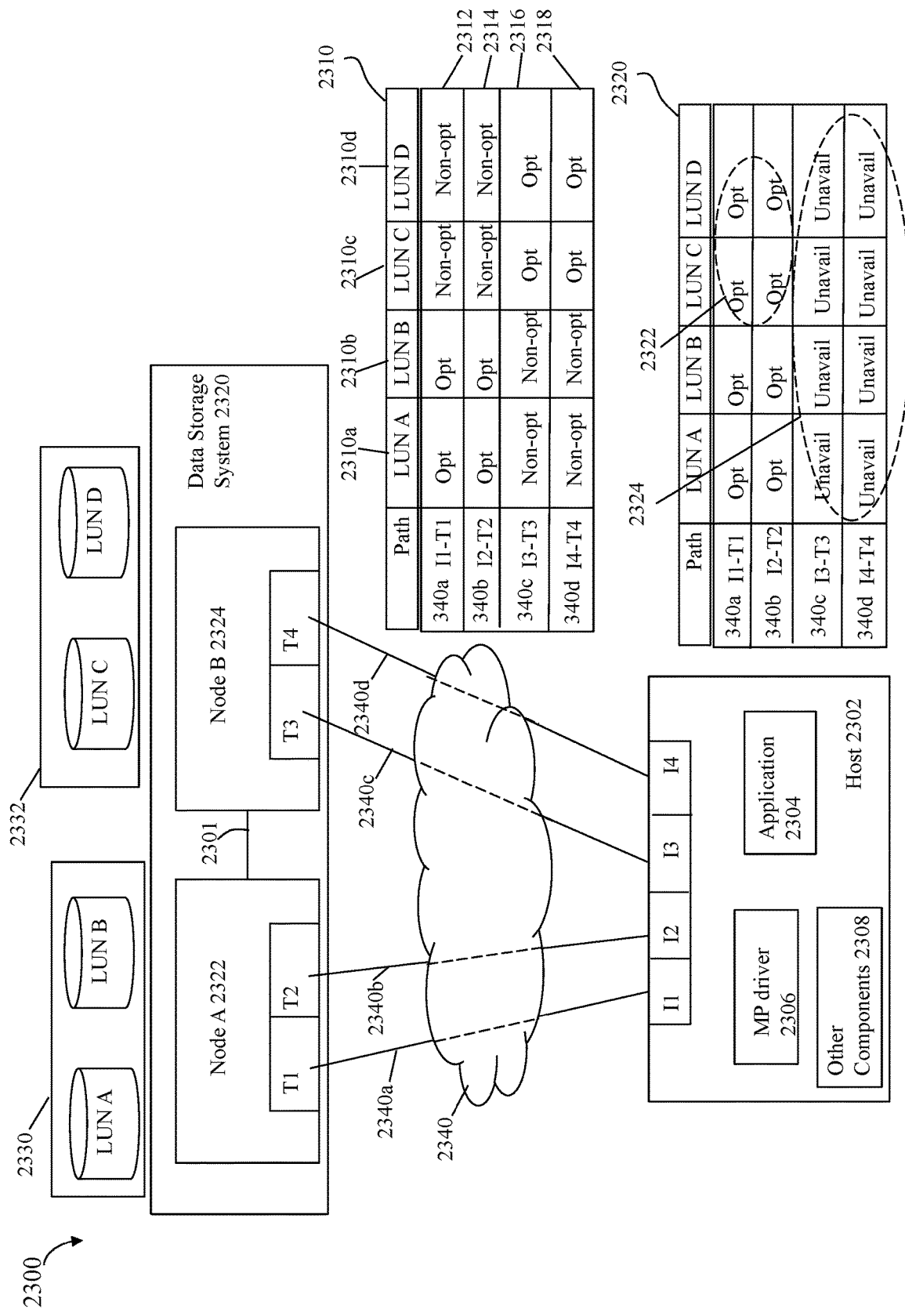
FIG. 9 is an example illustrating various path access states that may be set in an embodiment in accordance with the techniques herein.

Referring to FIG. 9, shown is an example of an embodiment of a system that may be utilized in connection with the techniques herein. The example 2300 includes a host 2302, a network 2340 and a data storage system 2320. The host 2302 and the data storage system 2320 may communicate over one or more paths 2340a-d through the network 2340. The paths 2340a-d are described in more detail below. The LUNs A and B are included in the set 2330, and the LUNs C and D are included in the set 2332. The LUNs of the sets 2330 and 2332 are configured from non-volatile BE storage PDs of the data storage system 2320. The data storage system includes two nodes—node A2 322 and node B 2324. The nodes 2322, 2324 may be as described elsewhere herein. The element 2301 denotes an internode communication connection similar, for example, to the connection 120 of FIG. 2. Consistent with other discussion herein such as in connection with FIG. 2, the BE PDs from which storage is provisioned for the LUNs of 2330, 2332 are accessible to both the nodes 2322, 2324.

The host 2302 may include an application 2304, a multi-path (MP) driver 2306 and other components 2308. The other components 2308 may include, for example, one or more other device drivers, an operating system, and other code and components of the host. An I/O operation from the application 2304 may be communicated to the data storage system 2320 using the MP driver 2306 and one or more other components of the data path or I/O path. The application 2304 may be a database or other application which issues data operations, such as I/O operations, to the data storage system 2320. Each of the I/O operations may be directed to a LUN, such as one of the LUNs of 2330, 2332, configured to be accessible to the host 2302 over multiple physical paths. As such, each of the I/O operations may be forwarded from the application 2304 to the data storage system 2320 over one of the possible multiple paths.

The MP driver 2306 may include functionality to perform any one or more different types of processing such as related to multipathing. For example, the MP driver 2306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. In some embodiments, host side load balancing may be performed by the MP driver to provide for better resource utilization and increased performance of the host, data storage system, and network or other connection infrastructure. The host 2302 may also include other components 2308 such as one or more other layers of software used in connection with communicating the I/O operation from the host to the data storage system 2320. For example, element 2308 may include Fibre Channel (FC), SCSI and NVMe (Non-Volatile Memory Express) drivers, a logical volume manager (LVM), and the like. It should be noted that element 2308 may include software or other components used when sending an I/O operation from the application 2304 where such components include those invoked in the call stack of the data path above the MP driver 2306 and also below the MP driver 2306. For example, application 2304 may issue an I/O operation which is communicated in the call stack including an LVM, the MP driver 2306, and a SCSI driver.

The data storage system 2320 may include one or more BE PDs configured to store data of one or more LUNs. Each of the LUNs 2330, 2332 may be configured to be accessible to the host 2302 through multiple paths. The node A 2322 in this example has two data storage system target ports T1 and T2. The node B 2324 in this example has two data storage system target ports T3 and T4. The host 2302 includes 4 host initiator ports I1, I2, I3 and I4. The path 2340a is formed using the endpoints I1 and T1 and may be denoted as I1-T1. The path 2340b is formed using the endpoints I2 and T2 and may be denoted as I2-T2. The path 2340c is formed using the endpoints I3 and T3 and may be denoted as I3-T3. The path 2340d is formed using the endpoints I4 and T4 and may be denoted as I4-T4.

In this example, all of the LUNs A, B C and D may be accessible or exposed over all the data storage system target ports T1, T2, T3 and T4 over the paths 2340a-d. As described in more detail below, a first set of paths to the node A 2322 may be specified as active-optimized or preferred for the LUNs of the set 2330 and a second set of paths to the node B 2324 may be specified as active-optimized or preferred for the LUNs of the set 2332. Additionally the first set of paths to the node A 2322 may be specified as active-non optimized or non-preferred for the LUNs of the set 2332 and the second set of paths to the node B 2324 may be specified as active-non optimized or non-preferred for the LUNs of the set 2330.

The multiple active paths allow the application I/Os to the LUNs A, B C and D to be routed over the multiple paths 2340a-d and, more generally, allow the LUNs A, B C and D to be accessed over the multiple paths 2340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 2306 may also perform other processing in addition to load balancing in connection with path selection. The MP driver 2306 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 2300, each of the LUNs A, B C and D may be exposed through the 4 paths 2340a-d. As described in more detail below, each of the paths 2340a-d may have an associated ALUA state also used by the host when issuing I/O operations. Each of the paths 2340a-d may be represented by two path endpoints—a first endpoint on the host 2302 and a second endpoint on the data storage system 2320.

The first endpoint may correspond to a port of a host component, such as a host bus adapter (HBA) of the host 2302, and the second endpoint may correspond to a target port of a data storage system component, such as a target port of a node of the data storage system 2320. In the example 2300, the elements I1, I2, I3 and I4 each denote a port of the host 2302 (e.g. such as a port of an HBA), and the elements T1, T2 T3 and T4 each denote a target port of a node of the data storage system 2320.

The MP driver 2306, as well as other components of the host 2302, may execute in kernel mode or other privileged execution mode. In one embodiment using a Unix-based operating system, the MP driver 2306 may execute in kernel mode. In contrast, the application 2304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 2304 may issue one or more I/O operations (e.g., read and write commands or operations) directed to the LUNs 330, 332 of the data storage system. Such I/O operations from the application 3204 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 2320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states. Although discussion herein may refer to the data storage system setting and modifying the path access states of the paths between the host and the data storage system, in some embodiments, a host may also set and/or modify the path access states which are then communicated to the data storage system.

In accordance with the techniques herein, the data storage system may set the path state for a particular LUN to preferred or non-preferred for any suitable purpose. In at least one embodiment, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which the host may issue I/Os to the LUN.

The element 2330 indicates that the LUN A and the LUN B are exposed to the host 2302 over preferred paths to the node A 2322 and non-preferred paths to the node B 324. The element 2332 indicates that the LUN C and the LUN D are exposed to the host 2302 over preferred paths to the node B 2324 and non-preferred paths to the node A 2322. Thus, the paths 2340c-d to the target ports T3 and T4 of node B 2324 are set to optimized or preferred for the LUNs C and D and set to non-optimized or non-preferred for the remaining LUNs A and B; and the paths 2340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 2322 over which the LUNs A, B, C and D are exposed; and the second TPG noted above may include all target ports of one of the nodes such as node B 2324 over which the LUNs A, B, C and D are exposed.

The table 2310 denotes the different path states for each of the 4 paths for the 4 LUNs A, B, C and D. The table 2310 reflects the path states as discussed above. The row 2312 indicates that path I1-T1 including the target port T1 of node A 2322 is active optimized (opt) or preferred for the LUNs A and B and active non-optimized (non-opt) or non-preferred for the LUNs C and D. The row 2314 indicates that path I2-T2 including the target port T2 of node A 2322 is optimized (opt) or preferred for the LUNs A and B and non-optimized (non-opt) or non-preferred for the LUNs C and D. The row 2316 indicates that path I3-T3 including the target port T3 of node B 2324 is optimized (opt) or preferred for the LUNs C and D and non-optimized (non-opt) or non-preferred for the LUNs A and B. The row 2318 indicates that path I4-T4 including the target port T4 of node B 2324 is optimized (opt) or preferred for the LUNs C and D and non-optimized (non-opt) or non-preferred for the LUNs A and B.

Assume further, for example, the node B 324 of the data storage system 2320 now experiences a failure so that the target ports T3 and T4 and thus the paths 2340c, 2340d are unavailable. In response to the failure of the node B 2324 and the target ports T3 and T4, the path states may be updated from the states of the table 310 to the revised path states of the table 2320. In the table 2320, due to the failure and unavailability of the paths 2340c-d, 1) the path states of 2322 indicate that the path 3240a I1-T1 and the path 2340b I2-T2 have transitioned from the non-optimized to the optimized or preferred path state for the LUNs C and D; and 2) the path states of 2324 indicate that the path I3-T3 2340c and the path 2340d I4-T4 for the LUNs A, B, C and D have transitioned to the unavailable state.

It is noted that other embodiments may have different path state changes than as denoted by the table 2320.

In at least one embodiment in accordance with the techniques herein in accordance with the ALUA standard, the host 2302 may issue commands to the data storage system 2320 to discover the particular ALUA path states associated with the various paths exposing the different LUNs 2330, 2332 to the host 2302. For example, the host 2302 may issues the report target port group (RTPG) command over the different paths exposing a particular LUN to determine the particular ALUA path state of each of the paths with respect to the particular LUN.

In at least one embodiment, the host 2302 may be notified regarding changes to ALUA path stages for LUNs exposed to the host 2302 by the data storage system. For example, the host 2302 may be notified regarding the ALUA path state changes or transitions illustrated by the table 2320.

In at least one embodiment, the data storage system 2320 may set the ALUA path states, for example, as illustrated by the table 2310 so that the host 2302 sends all I/Os directed to a particular LUN to a single one of the nodes of the system 2320. Path state changes may be made subsequently as needed, for example, in response to path failures such as described above in connection with the table 2320.

In one dual node system in at least one embodiment in accordance with the techniques herein, the log may include page blocks or PBs and page descriptors or PDESCs as mentioned above. Each write I/O that writes data to a target logical address may have its associated write data stored in the log using a PB and a PDESC. The write data is stored in a PB and the PDESC references or points to the PB containing the write data. The PDESC may generally include other information regarding the write I/O such as, for example, the target logical address (e.g., LUN and LBA or offset), the sequence ID, a pointer (ptr) or reference to the PB including the write data associated with the PDESC, and other information such as flags associated with the logged operation or request.

In one such dual node system, the designated primary node that assigns sequence IDs may also be the sole node managing the page descriptors or PDESCs stored in the log. Thus the primary node is the sole node of the pair that assigns sequence IDs of logged requests or operations received by both nodes. The primary node may also be the sole node that handles allocating PDESCs and freeing PDESCs on behalf of requests or operations received by both nodes. Thus, in an active-active configuration where both nodes of the pair may receive I/Os and other commands, all requests for new sequence IDs and new PDESC allocations of the log may be done only by the primary node even though the received I/Os or other commands may be received by the peer non-primary node. The primary node may assign monotonically increasing sequence IDs to new requests. In such a system, each node receiving the I/O or other command recorded in the log obtains an available PB from the log.

In at least one such system, the node A may have its own separate PB partition or tier of PBs managed solely by the node A, where the node A may allocate and free PBs from its own PB tier. However, peer node B may have read access to the data stored in the PBs of node A's PB tier. In such a system, the node B may have its own separate PB tier or partition of PBs managed solely by the node B, where the node B may allocate and free PBs from its own PB tier. However, peer node A may have read access to the data stored in the PBs of node B's PB tier.

In at least one embodiment in accordance with the techniques herein, a complete set of the PDESCs of the log may be stored in the local volatile memory of each node, where the complete set of PDESCs may be local memory resident and may not be evicted from the local memory of each node. In contrast, at least some of the PBs of the log may be maintained in a portion of the node's local volatile memory used as a node-local cache that is subjected to eviction in accordance with local memory management of the node. In this manner, for a write operation that is received by a node, the data written by the write operation may be stored in a PB of the log by the receiving node. Additionally, the node receiving the write may also store the write data in the node's volatile memory cache managed in accordance with the local memory management of the node's cache policy. Thus, the write data written by the write operation may be expected to be, or is likely to be, in the local volatile memory cache of the node that received the write operation.

In at least one embodiment in accordance with the techniques herein, each of the nodes may also maintain its local volatile memory a flush working set (FWS) (also sometimes referred to herein simply as working set). In at least one embodiment, the FWS may be a structure that organizes recorded operations each represented by a PDESC-PB pair of the log into logical groupings or containers of logged operations. In at least one embodiment, the FWS may be a hierarchical structure that includes containers of PDESCs. The PDESCs of a container may be, for example, a linked list of the PDESCs also stored in the volatile memory of each node. In at least one embodiment as discussed elsewhere herein, each container may be associated with a specified LBA subrange of consecutive LBAs of a particular LUN. In this manner, a container may be a linked list that connects together in the same container those PDESCs for logged writes that write data to an LBA in the specified LBA subrange of the container.

In at least one embodiment, multiple log records of the log associated with the same MD leaf may be included in the same container. As discussed elsewhere herein, each MD leaf may be associated with an LBA subrange of a LUN, where the MD leaf is included in the MD or mapping information used to map logical addresses in the LBA subrange to corresponding physical storage locations. Thus each container may be associated with an LBA subrange of one of the MD leaves, where the container includes the PDESCs of logged writes that write data to an LBA in the LBA subrange of the one MD leaf.

In at least one embodiment, a PDESC may be added to the FWS of a node as the node performs processing for the PDESC in accordance with the protocol described below. In this manner, each node may maintain the PDESCs organized in an arrangement of containers of the FWS.

In at least one embodiment, the FWS of each node may be a hierarchical structure such as a tree, one or more hash tables, or other suitable structures that may vary with embodiment. Generally, the FWS may be characterized as a structure of containers that may also sometimes be referred to herein as leaf containers (LCs), where each LC may be associated with an LBA range of a different one of the MD leaf nodes of the mapping information. In at least one embodiment, each LC may be associated with one of the MD leaves, where the LC may be a linked list of the PDESCs of logged operations directed to an LBA associated with the MD leaf. In this manner, the FWS may generally represent the content of the log organized and sorted by LCs. In at least one embodiment, a PDESC for a logged write may be added to the FWS of a node during ingestion of the write.

In at least one embodiment, each of the two nodes may include a node local copy of the FWS in volatile memory of the node. In at least one embodiment, the FWS of each node may include no instances of LCs when the system starts up. In such an embodiment, each instance of an LC in the FWS of a node may be created or allocated dynamically in connection with servicing the initial (e.g., first in time) write to a particular LC. Each LC may be associated with a defined LBA range so that the initial write to the defined LBA range triggers the allocation or creation of the LC instance on each node's local FWS. In some contexts herein, a particular node receiving a write or other operation may be referred to as an initiator node with respect to the particular write or other operation. In connection with an initiator node receiving a write operation directed to a target logical address, the target logical address is included in a defined LBA range that is associated with one of the MD leaf nodes, and the defined LBA range is also associated with an LC including logged writes falling in the defined LBA range. For an initiator node receiving the initial write to the defined LBA range associated with a MD leaf where the MD leaf is further associated with an LC, an instance of the LC in the initiator node's local FWS may be created in response receiving the initial write.

Thus, prior to receiving this initial write directed to a particular LBA of a LUN, the initiator node's FWS may not include the instance of the LC having an associated LBA range including the particular LBA of the initial write. Additional processing in connection with the protocol described below to synchronize the peer's FWS may also result in creating or allocating an instance of the LC in the peer node's FWS if such an instance of the LC having the defined range does not already exist in the peer node's FWS.

In at least one embodiment, each instance of an LC in the FWS of a node may be created or allocated dynamically as noted above. In such an embodiment, the LCs may be implemented as linked lists of PDESCs of the log, where the PDESCs may be the node's local copies of the PDESCs. When the LC is initially created or allocated, the particular items created or allocated may vary with the particular structure used to implement the LC. In at least one embodiment in which each of the LCs is implemented as a linked list, the initial allocation or creation of the LC may include, for example, allocating pointers and other items used to generally maintain the list such as to add and remove PDESCs from the list, and the like.

Figure 10:
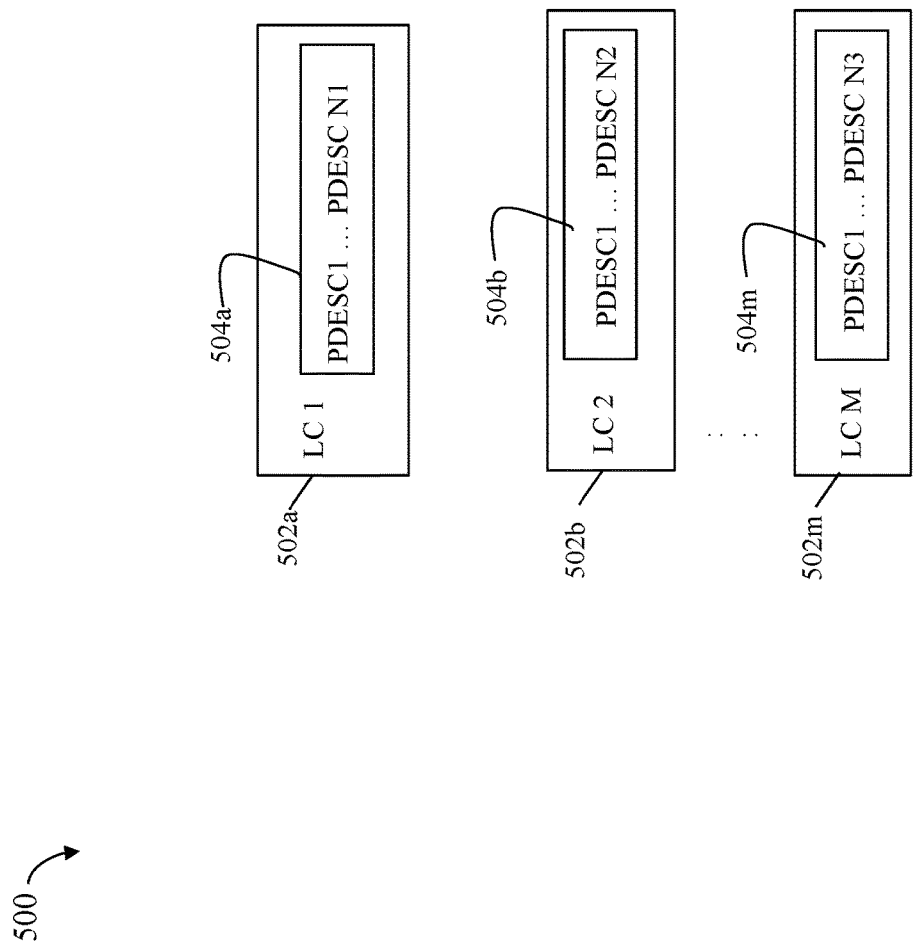
FIG. 10 is an example of containers of logged operations that may be used in an embodiment in accordance with the techniques herein.

Referring to FIG. 10, shown is an example 500 illustrating LC instances of an FWS of a node in at least one embodiment in accordance the techniques herein. Consistent with other discussion herein, the FWS 500 may generally be any suitable structure or arrangement used to organize the LCs of logged requests or operations of the log. The FWS may be, for example, a tree structure, one or more hash tables, or other hierarchical structure used to maintain the LCs in a sorted organization to facilitate lookup of a particular LC given a particular LBA. At a point in time P, the FWS of a node may include the PDESCs of the logged requests or operations currently stored in the log at the time P. As discussed elsewhere herein, each node may store its own local copy or instance of the FWS whereby the protocol discussed elsewhere herein provides for maintaining synchronized copies of the FWS on both nodes in a dual node system.

The example 500 illustrates an example of the FWS after the system has processed multiple writes that are recorded in the log, where each of the writes is recorded in the log using a PDESC-PB pair. The FWS 500 includes the LCs 502*a-m*. The LC 1 502*a* includes a linked list of PDESCs 504*a*. The LC 2 502*b* includes a linked list of PDESCs 504*b*. The LC M 502*m* includes a linked list of PDESCs 504*m*. Thus, the FWS may be characterized in one aspect as a structure of LCs including the PDESCs of the log.

In at least one embodiment, each node may include a local volatile memory copy of the PDESCs of the log, where the FWS may further include the LCs 502*a-m* that are linked lists formed using the PDESCs stored in the node's local copy. Thus the LCs of the FWS may denote a particular logical organization or grouping of the PDESCs of logged operations based on the target logical address LUN and LBA of the logged operations described by the PDESCs. Each of the LCs 502*a-m* has an associated LBA range of a particular LUN, and each PDESC is included a particular one of the LC's, where the PDESC's target logical address falls in the associated LBA range of the particular one LC. In this example, each LC of the FWS may be implemented as a linked list of PDESCs. More generally any suitable structure may be used for each of the LCs.

At the start, boot, or initialization of system, there may be no logged writes so the FWS may include no LCs. Each LC instance of an FWS may be created in response to processing the initial operation, such as the initial write, that is mapped to the LC instance. For example the initial write may be directed to an LBA that falls into the LBA range of the LC instance 502*a* whereby the LC instance 502*a* is created in response to the initial write, and the log record of the initial write is included on the linked list 504*a* of the LC instance 502*a*. Subsequent writes or requests that are mapped to the same LC instance 502*a* are placed on the linked list 504*a*.

To further illustrate, assume that there is an empty log and thus there are no LCs and no PDESCs in the log or the FWS. At a first point in time P1, assume an initiator node receives a first write that writes first data to a first logical address at LUN A, LBA 0. Assume each of the LCs 502*a-m* has an associated LBA range of 512 corresponding to the size of the LBA range associated with each MD leaf in at least one embodiment in accordance with the techniques herein. However, at the time P1, none of the LCs 502*a-m* have been created and are not yet included in the FWS. In response to receiving the first write, the initiator node may create the LC1 502*a* having an associated LBA range of 0-511 for the LUN A, and may associate the logged record of the first write with the LC 502*a*. The first write may be recorded in the log using a first PDESC-PB pair of the log, where the initiator node's local copy of the PDESC of the first pair may be included on the linked list 504*a* of PDESCs having associated LBAs that fall in the LBA range 0-511.

At a second point in time P2 subsequent to P1, a second write may be received by the initiator node, where the second write writes second data to the logical address LUN A, LBA 100. The second write may be recorded in the log using a second PDESC-PB pair of the log, where the initiator node's local copy of the PDESC of the second pair may be included on the linked list 504*a* of PDESCs having associated LBAs that fall in the LBA range 0-511.

At a third point in time P3 subsequent to P2, a third write may be received by the initiator node, where the third write writes third data to the logical address LUN A, LBA 1000. The third write may be recorded in the log using a third PDESC-PB pair of the log. The initiator node may determine that the PDESC of the third pair is directed to the LBA 1000 that falls into the LBA range of 512-1023 associated with a second LC 502*b*. The initiator node may further determine that the second LC 502*b* does not yet exist in the FWS of the node. As such, the LC 502*b* having the associated LBA range of 512-1023 may be created. Additionally, the initiator node's local copy of the PDESC of the third pair may be included on the linked list 504*b* of PDESCs having associated LBAs that fall in the LBA range 512-1023.

As discussed elsewhere herein with a protocol used to process received operations or requests, such as write operations received by the nodes, each of the nodes may include a local copy of the FWS where the local copies of the two nodes may be synchronized as each received write operation is processed using the protocol.

In at least one embodiment, the FWS of a node may be shared and used by flush worker threads or processes of the node. In at least one embodiment, both of the nodes in a dual node system may independently perform processing to flush the log when log flushing has been triggered. In connection with flushing the log, data is destaged from the log to the non-volatile BE PDs and the log space may be reclaimed for reuse.

When flushing, each of the nodes may execute one or more code entities, such as flush worker threads or processes, that operate independently. In at least one embodiment, flush worker threads executing on a node may use the node's local FWS and detach LCs from the node's local FWS for flushing. Since the FWS is a structure that may be shared among multiple flush worker threads or processes on the same node, any suitable synchronization technique may be used to synchronize access to the FWS among such threads or processes executing the same node. As discussed in more detail below, flush worker threads of a node, such as node A, may detach LCs of the FWS stored locally on the node A. The LCs detached for flushing by the flush worker threads of a node may be based on the concept of ownership assigned to the individual LCs. Consistent with other discussion herein, the LCs detached for flushing by the flush worker threads of the node A may only be those LCs having the node A designated as the LC owner. The LCs may be viewed as detachable units or containers of PDESCs of the log to be flushed. Thus, a thread or process of a node, such as the node A, performing flushing may detach LCs owned by the node A from the FWS of the node A until a sufficient number of LCs have been detached to fill a buffer of a particular size to be destaged from the log to the BE PDs. The buffer may include the PBs of the user data or content stored by the logged write operations. The mapping information or MD (e.g., FIG. 8) used to map logical address to physical storage locations may also be accordingly updated as the logged writes are flushed from the log to the BE PDs. Additionally, as the LCs of the PDESCs or the logged writes are flushed from the log, the FWS and the log may be accordingly updated. Log space (e.g., the PDESCs and PBs of the log) associated with the flushed records may be reclaimed for reuse.

In at least one embodiment, each logged write operation may be represented by a PDESC-PB pair of the log. Each LC may be associated with an LBA range of one of the LUNs storing user data. Storing the PDESC-PB pair in the log as part of the protocol described in more detail below may include storing the PDESC of the pair in a particular LC of the FWS structure on each of the nodes, where the PDESC-PB pair logs a write to a target logical address expressed using a target LUN and target LBA, and where the particular LC is associated with an LBA range including the target LBA for the target LUN. The particular LC in the FWS may be determined in any suitable manner. In at least one embodiment, the LBA range of a single LC may also be associated with a MD leaf In this manner, the PDESCs of the same LC may denote writes to the same LBA range associated with the same MD leaf. For example, in at least one embodiment, an LC associated with a particular MD leaf may be determined using a deterministic mathematical function that maps each PDESC-PB pair to an LC, where the PDESC-PB pair may write to a target LBA or offset of a target logical address and the LC has an associated LBA range including the target LBA.

In at least one embodiment in accordance with the techniques herein, ownership of each LC may be determined by the first or initial ingestion to this LC. For example, if the initial or first in time write to a particular LBA range associated with some MD leaf is done through the node A, then the node A owns the entire LC and will handle flushing the LC. The foregoing is based on an assumption in at least one embodiment using ALUA where logically consecutive LBAs of the same LUN or volume are written by the same node. In such an embodiment in accordance with the ALUA protocol as described elsewhere herein, I/Os for each volume or LUN may be directed to a particular one of the nodes based on a preferred path state. Thus, it may be expected that all I/Os directed to a particular LUN or volume are directed to the same single node or the same set of target ports. Based on this assumption, the node that receives the first or initial write I/O that writes to a target LUN and LBA included in a particular LBA range associated with an LC may be assigned as the owner of the LC. The owner of an LC may be the node that flushes the recorded logged writes of the LC. Thus with ALUA, an assumption is that writes to neighboring or logically nearby LBAs that are, for example, included in the same LUN or volume, or included in the same subrange of consecutive LBAs of a LUN, are likely to be written by the same node.

In at least one embodiment, each existing LC instance may have one of the following 3 defined ownership states at any point in time:

None. This container ownership state of none indicates that the LC has been created but the initial protocol for processing the initial logged write of the LC is in progress and has not yet completed. When the ownership state of an LC is none, the LC may not be flushed.

Node A is the owner of the LC and node A will flush the LC. In at least one embodiment in accordance with the ALUA standard, this container ownership state indicates that the initial logged write of the LC was received by the node A. In other words for such an embodiment in accordance with the ALUA standard, the initial write to a target address with an LBA falling into the LBA range of the LC was received by the node A. In connection with container ownership, it is assumed that the system includes two nodes referred to in the context of ownership as node A and node B.

Node B is the owner of the LC and node B will flush the LC. In at least one embodiment in accordance with the ALUA standard, this container ownership state indicates that the initial logged write of the LC was received by the node B. In other words for such an embodiment in accordance with the ALUA standard, the initial write to a target address with an LBA falling into the LBA range of the LC was received by the node B.

Once an LC instance is created, it may transition between ownership states such as described in connection with the protocol below. For example, as described below in connection with the protocol for processing requests or operation received at the nodes, an LC instance stored in an FWS of a node may be created in response to the initial write to the LBA range of the LC instance. On creation, the LC instance may be assigned an ownership state of none, and then transition to either node A or node B.

The protocol described in the following paragraphs assigns a new ownership attribute to each LC where the ownership indicates whether the node A or node B owns the LC. The node designated as the owner of an LC flushes the LC. In this manner, the flush worker threads executing on the cores or processors of the node A only flush LCs having an owner attribute of node A, and the flush worker threads executing on the cores or processors of the node B only flush the LCs having an ownership attribute of the node B.

Figure 11:
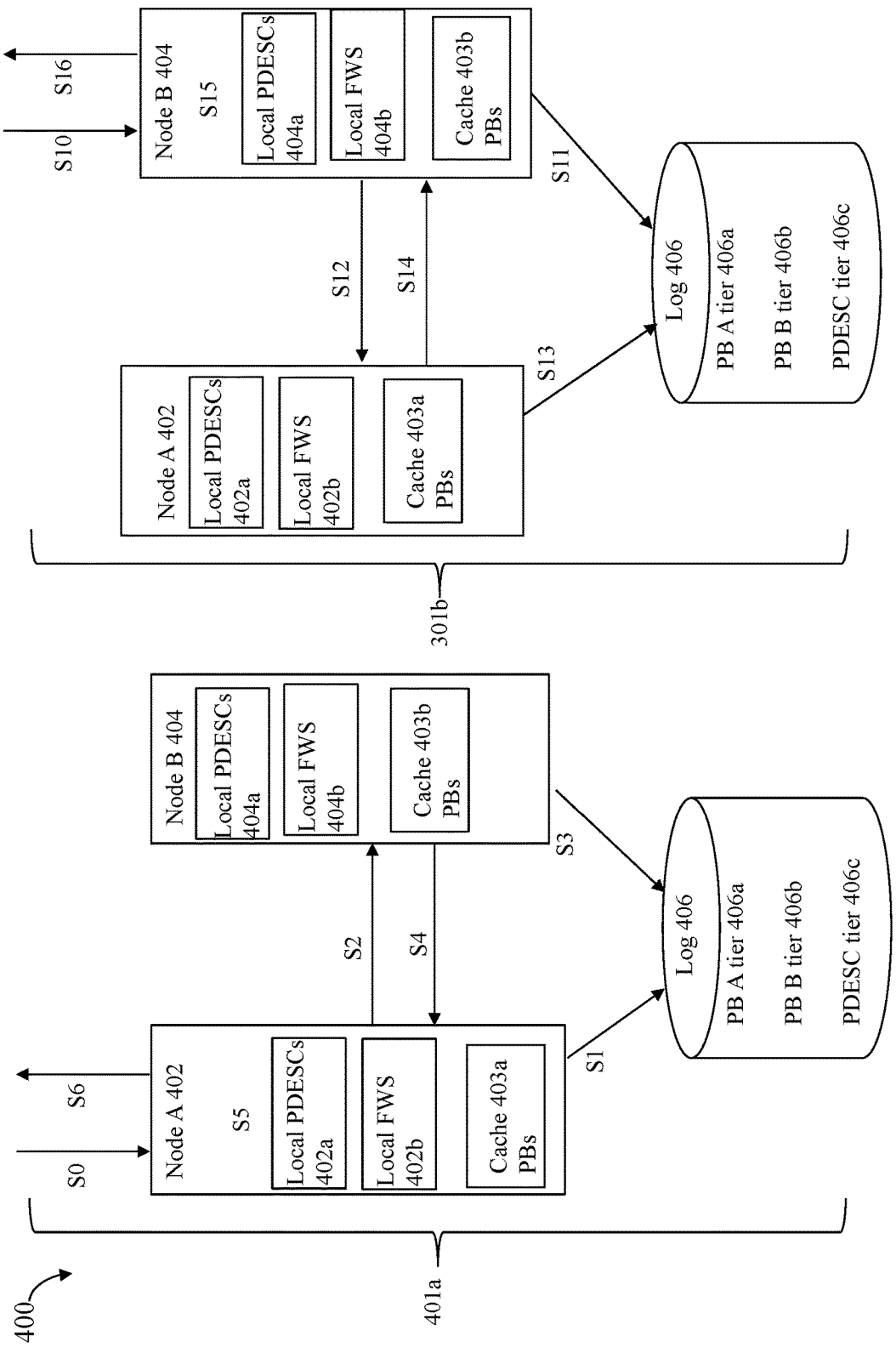
FIGS. 11, 12 and 13 illustrate data flow and processing steps that may be performed in an embodiment in accordance with the techniques herein.

Referring to FIG. 11, shown is an example 400 illustrating a protocol that may be used in a system in accordance with the techniques herein to process received requests. The example 400 illustrates the dual node architecture including a node A 402, a node B 404, and the log 406. For purposes of illustration in discussion below related to FIG. 11, assume the primary node is node A.

The example 400 includes an element 401a denoting the sequence of steps performed in at least one system to process the write I/O operation received by the primary node which for purposes of illustration is the node A. The example 400 includes an element 401b denoting the sequence of steps performed in at least one system to process the write I/O operation received by the non-primary node which for purposes of illustration is the node B.

Consistent with other discussion herein, both the nodes A 402 and B 404 have local synchronized copies of the PDESCs (e.g., MD of the log) in their local volatile memory. The element 402a denotes the local volatile memory copy of the PDESCs of the log 406 stored on the node A 402. The element 404a denotes the local volatile memory copy of the PDESCs of the log 406 stored on the node B 404.

As noted elsewhere herein, both of the nodes A 402 and B 404 have local synchronizes copies of the FWS structure in their local volatile memory. The element 402b denotes the local volatile memory copy of the FWS stored on the node A 402. The element 404b denotes the local volatile memory copy of the FWS stored on the node B 404.

As also noted elsewhere herein, both of the nodes A 402 and B 404 may have a copy of at least some portion of the PBs of the log 406 stored in a portion of each node's local volatile memory used as the node's local cache. For example, the element 403a may denote the local volatile memory cache used by the node A 402, where the cache 403a may include at least some of the PBs for write operations received by the node A. The element 403b may denote the local volatile memory cache used by the node B 404, where the cache 403b may include at least some of the PBs for write operations received by the node B. Generally, the cache 403a of the node A may be a designated portion of the node A's volatile memory, such as RAM, used as the node A's local data cache for storing data such as some portion of the PBs for writes received by the node A. The PBs and other data stored in the node A's local data cache 403a may be subject to eviction in accordance with the particular caching policy implemented. In contrast, the copies of the FWS 402b and the PDESCs 402a stored in the node A's local volatile memory may be memory resident. In a similar manner, the cache 403b of the node B may be a designated portion of the node B's volatile memory, such as RAM, used as the node B's local data cache for storing data such as some portion of the PBs for writes received by the node B. The PBs and other data stored in the node B's local data cache 403b may be subject to eviction in accordance with the particular caching policy implemented. In contrast, the copies of the FWS 404b and the PDESCs 402b stored in the node B's local volatile memory may be memory resident.

Referring to the element 401a, at a step S0, the node A 402 receives the write I/O from a host. Following the step S0, a step S1 is performed in which the node A 402 allocates a PB for the write I/O in the log 406, and persistently stores the write data of the received write I/O in the PB of the log 406. The step S1 may also include storing the received write I/O data or payload in the node A's local data cache 403a. The log 406 includes a PB A tier 406a, a PB B tier 406b, and a PDESC tier 406c. The PB A tier 406a denotes the PBs managed exclusively by the node A. In the step S1, the node A allocates the PB for the write I/O from the PB A tier 406a. The PB B tier 406b denotes the PBs managed exclusively by the node B. The PDESC tier 406c denotes the PDESCs managed by the primary node, which in this example is node A.

Also in the step S1, the node A 402 performs additional processing. The write I/O received in the step S0 writes first data to a target logical address, such as a LUN and a target LBA or offset on the LUN. In the step S1, the node A 402 performs processing to map the write I/O to a particular LBA range of an LC that will include the log record for the write I/O, and determining whether an instance of the particular LC exists in the FWS 402b. If the particular instance of the LC does not already exist in the FWS 402b, then the instance of the LC is created and included in the FWS 402b. The additional processing of the step S1 may include determining whether the local FWS 402b of the node A includes an instance of an LC with an associated LBA range that includes the target LBA of the received write I/O. Put another way, does the LC (having the LBA range including the target LBA of the write) already exist in the FWS 402b? If such an LC instance does not already exist in the FWS 402b of the node A, then the LC instance is created in the FWS 402b and assigned the ownership of none. The ownership of none assigned to the newly created LC of the FWS 402b is a temporary ownership state indicating that processing of the protocol is still in progress for the initial or first in time logged write to be stored in the newly created LC. If the LC instance mapped to the received write I/O already exists, nothing further is done to the LC in the step S1. Following the step S1 is a step S2.

In the step S2, the node A 402, as the primary node, allocates a PDESC from the PDESC tier 406c of the log 406, assigns a new sequence ID to the PDESC, and creates a local in-memory copy (402a) of the descriptor information to be stored in the PDESC. The descriptor information includes the new sequence ID, the target logical address and a pointer or reference to the allocated PB including the first data written by the received write I/O. The local in-memory copy 402a may be a node-local copy of the PDESCs in the node A's local memory (e.g., RAM or other form of volatile memory) accessible only to the node A 402. In the step S2, the node A 402 sends the descriptor information and the address of the PDESC in PDESC tier 406c of the log 406 to the peer node B 404. The message sent in the step S2 to from the node A to the node B may also be characterized as a commit message requesting the node B to perform processing as a peer node to commit or service the request or operation described by the PDESC of the message. Following the step S2 is a step S3.

Figure 12:
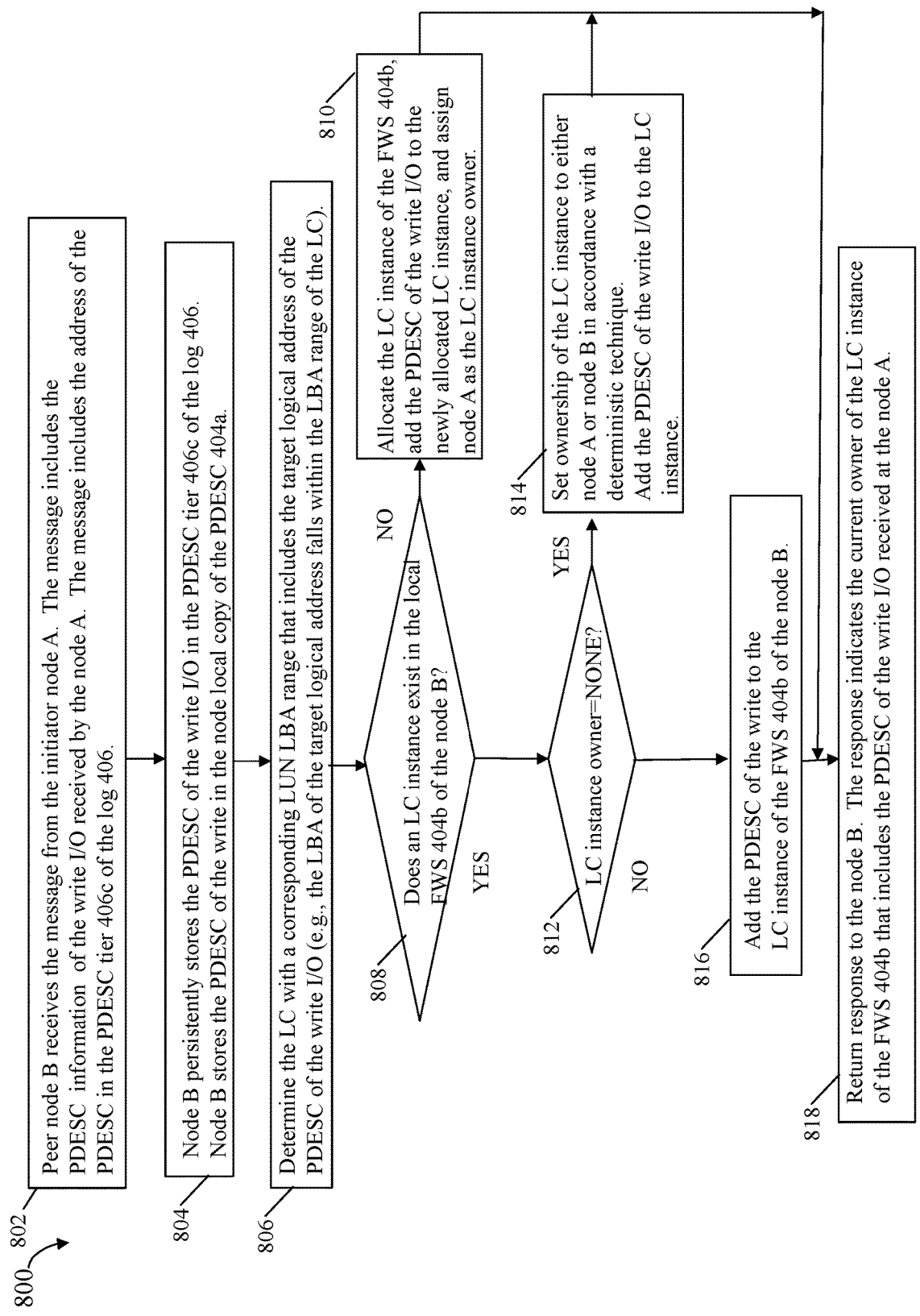

Processing of the steps S3 and S4 as performed by the peer node B are described below with reference to the flowchart 800 of FIG. 12. Thus, in at least one embodiment, the flowchart 800 describes steps 802, 804, 806, 808, 810, 812, 814 and 816 that may further comprise the step S3; and the step 818 that may comprise the step S4.

In the step S3, the peer node B 404 receives (in a step 802) a message from the initiator node A. The message includes the descriptor information and the address of the allocated PDESC in the log 406. Following the step 802, the node B performs the step 804 and persistently stores the descriptor information of the write I/O in the PDESC located at the address in the log 406. In the step 804, the peer node B 404 also stores a copy of the PDESC of the write I/O in its node-local copy of the PDESCs 404a in its local memory (e.g., RAM or other form of volatile memory) accessible only to node B 404. Following the step 804 is a step 806.

In the step 806, the node B 404 performs processing to determine the LC with a corresponding LUN LBA range that includes the target logical address of the PDESC of the write I/O (e.g., the LBA of the target logical address of the PDESC of the write falls within the LUN LBA range of the LC). Put another way, the node B maps the LUN LBA of the PDESC of the write I/O to a particular LBA range of an LC that will include the log record for the write I/O, and then in the step 808, determines whether an instance of the LC exists in the FWS 404b of the node B.

If the step 808 evaluates to no, control proceeds to the step 810. At the step 810, if the instance of the LC does not already exist in the FWS 404b, then processing is performed where:

the instance of the LC is allocated or created and included in the FWS 404b;

the PDESC of the write I/O is included in the newly allocated LC of the FWS 404b; and the instance of the newly allocated LC is assigned node A as the LC owner (the node that received the write I/O in the step S0).

Following the step 810, control proceeds to the step 818.

If the step 808 evaluates to yes where the particular instance of the LC does exist in the FWS 404b, then a further determination is made in the next step 812 to determine whether the owner of the LC instance is indicated as none. If the step 812 evaluates to yes where the ownership of the LC instance of the FWS 404b is none, then control proceeds to the step 814. At the step 814, the node B 404 may use a default deterministic technique to assign a default ownership of either node A or node B to the LC instance. In this case, the LC instance has an ownership state that transitions from "none" to the new owner node assigned by the default deterministic technique. In at least one embodiment, the default deterministic technique may be a deterministic mathematical function used to determine the owner node of the LC instance. In at least one embodiment, the deterministic function may assign ownership to the LC instance in accordance with a property, such as a unique identifier (ID), of the MD leaf having the same LBA range as the LC instance. Recall as described elsewhere herein, each of the MD leaf nodes may be associated with a LUN's LBA range indicating the MD leaf node is used in mapping logical addresses of the LUN's LBA range to corresponding physical storage locations. The LC instance corresponding to the MD leaf node includes PDESCs of logged writes to logical addresses in the LUN's LBA range of the MD leaf node. The unique ID of each MD leaf may be an integer. For LCs associated with MD leaf nodes having unique IDs that are odd, the function may assign the LCs to the node A; otherwise for remaining LCs associated with MD leaf nodes having unique IDs that are even, the function may assign the LCs to the node B. Following the step 814, control proceeds to the step 818.

It should be noted that if the owner of the LC instance in the FWS 404b of the peer node B is none (e.g., as determined when the step 812 evaluates to yes or true), it means that there are two concurrent writes directed to the same LUN LBA range of the LC being processed using the protocol, where one of the writes is received on node A and the other write is received on the node B. In this case, the embodiment may not use ALUA or may more generally not have an ALUA path states for the LUN set to active optimized for only a single one of the two nodes. Rather, the foregoing two concurrent writes indicate that the host is sending write I/Os directed to the same LUN to both of the nodes. If this condition occurs where there are two concurrent writes to the same LUN LBA received on the two nodes, an embodiment in accordance with the techniques herein may use the deterministic mathematical function to perform a default ownership assignment.

If the step 812 evaluates to no, where the particular instance of the LC does exist in the FWS 404b and the owner of the LC instance is something other than none (e.g., the owner of the existing LC instance is either node A or B), then control proceeds to the step 816. At the step 816, the PDESC of the write is added to the LC instance of the FWS 404b.

In this case, the ownership has already been assigned in connection with a prior write that is logged and included in the LC instance of the FWS 404b. Following the step 816, control proceeds to the step 818. Following the step S3 is a step S4. The step S4 may include the processing of the step 818 of FIG. 12.

In the step S4, the peer node B 404 returns or sends (818) a response to the receiving node A 402 indicating that the PDESC is stored persistently in the log 406. The response may also indicate the current owner assigned to the LC. The node A 402 receives the response from the node B 404. Following the step S4 is a step S5.

In the step S5, the node A 402 may set the ownership of the instance of the LC of the local FWS 402b to the current owner of the LC as indicated in the response returned in the step S4 from the node B. Additionally in the step S5, the node A 402 may also add the node A's local copy of the PDESC for the write I/O received to the instance of the LC included in the FWS 402b. Following the step S5 is a step S6. In the step S6, the initiator node A sends a response to the host regarding successful completion of the write I/O operation received in the step S0.

It should be noted that between the steps S4 and S5, an invariant of the algorithm or logic of the protocol and should always evaluate to true. The invariant is that, after the step S4 bur prior to the step S5, either the current ownership of the initiator node A's s local copy of the LC instance is "none", or otherwise should be the same ownership value returned by the peer node B in the response in the step S4.

In the foregoing protocol processing of 401a, the PDESC of a received write may always be allocated by the primary node and the descriptor information of the PDESC of the received write may be persistently stored to the log 406 by the peer node B that did not receive the write.

In the element 401a the primary node A 402 receives the write I/O operation. However in a dual node architecture, both the node A 302 and its peer node B may receive write I/Os as well as other commands and operations. Reference is now made to the element 401b illustrating the sequence of processing steps performed in at least one system to process the write I/O operation received by the non-primary node, which for purposes of illustration in this example is the node B.

At a step S10, the non-primary node B receives a write I/O from a host. Following the step S10, a step S11 is performed in which the node B 404 allocates a PB for the write I/O in the log 406, and persistently stores the write data of the received write I/O in the PB of the log 406. The step S11 may also include storing the received write I/O data or payload in the node B's local data cache 403b. In the step S11, the node B allocates the PB for the write I/O from the PB B tier 406b. The PB B tier 406b denotes the PBs managed exclusively by the node B. The PDESC tier 406c denotes the PDESCs managed by the primary node, which in this example is node A.

Also in the step S11, the node B 404 performs additional processing. The write I/O received in the step S10 writes first data to a target logical address, such as a LUN and a target LBA or offset on the LUN. In the step S11, the node B 404 performs processing to map the write I/O to a particular LBA range of an LC that will include the log record for the write I/O, and determines whether an instance of the particular LC exists in the FWS 404b of the node B. If the particular instance of the LC does not already exist in the FWS 404b of the node B, then the instance of the LC is created and included in the FWS 404b. The additional processing of the step S11 may include determining whether the local FWS 404b of the node B includes an instance of an LC with an associated LBA range that includes the target LBA of the received write I/O. Put another way, does the LC (having the LBA range including the target LBA of the write) already exist in the local FWS 404b of the node B? If such an LC instance does not already exist in the FWS 404b of the node B, then the LC instance is created in the FWS 404b and assigned the ownership of none. The ownership of none assigned to the newly created LC of the FWS 404b is a temporary ownership state indicating that processing of the protocol is still in progress for the initial or first in time logged write to be stored in the newly created LC. If the LC instance mapped to the received write I/O already exists, nothing further is done to the LC in the step S11. Following the step S11 is a step S12.

In the step S12, the node B 404 issues a request to the primary node A to allocate a PDESC from the PDESC tier 406c of the log 406 and to also assign a new sequence ID to the allocated PDESC. In the step S12, the node B 404 receives from the primary node A the address of the PDESC in the PDESC tier 406c and receives from the node A the new sequence ID. The node B 404 creates a local copy 404a of the descriptor information to be stored in the PDESC. The descriptor information, PDESC for the write I/O, includes the new sequence ID, the target logical address, and a pointer or reference to the allocated PB. The local copy 404a of the descriptor information or PDESC may be a node-local copy of the PDESCs in the node B's local memory (e.g., RAM or other form of volatile memory) accessible only to the node B 404. In the step S12, the node B 404 sends the descriptor information and the address of the allocated PDESC in the log 406 to the peer node A 402. The message sent in the step S12 to from the node B to the node A may also be characterized as a commit message requesting the node A to perform processing as a peer node to commit or service the request or operation described by the PDESC of the message. Following the step S12 is a step S13.

Figure 13:
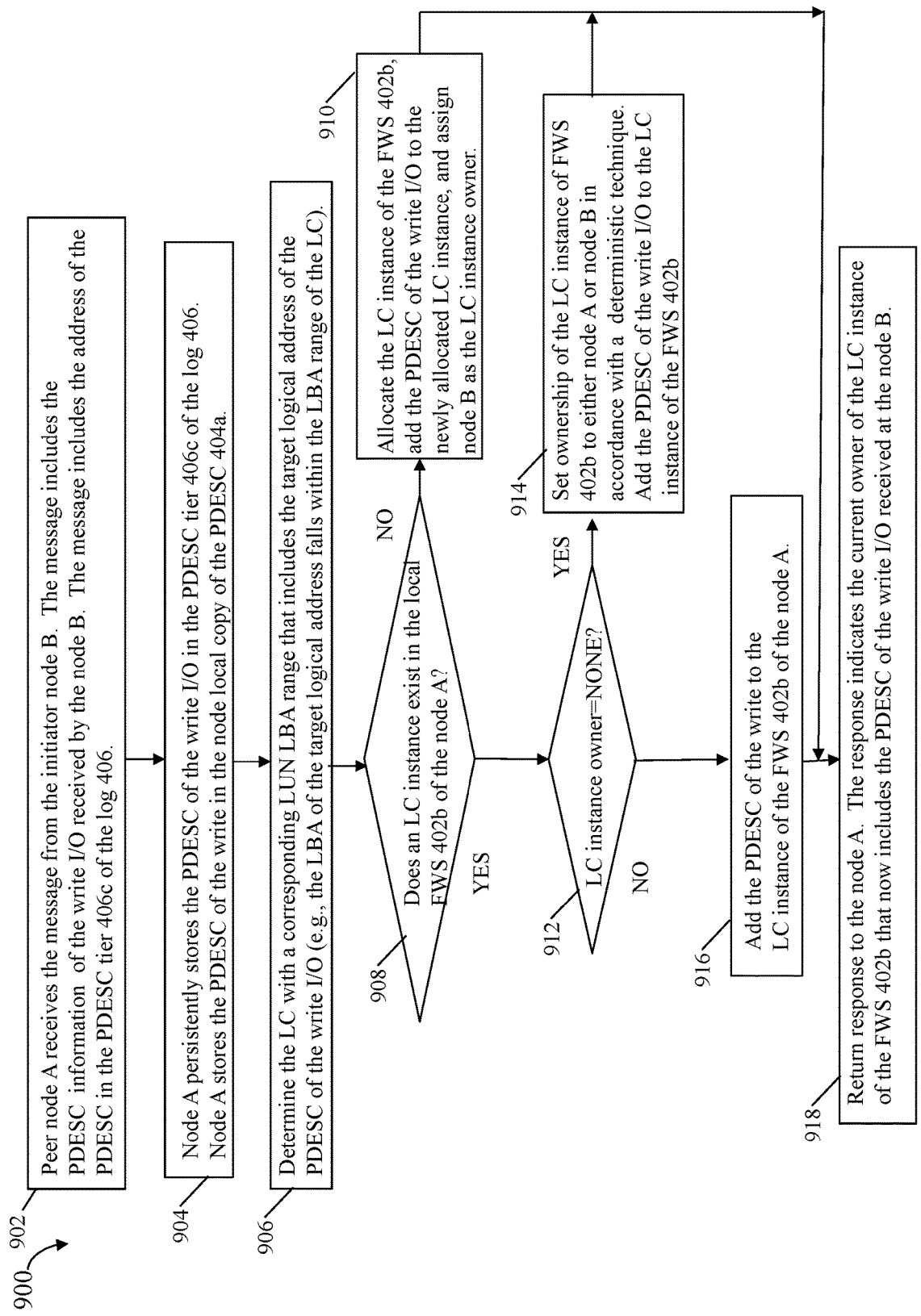

Processing of the steps S13 and S14 as performed by the peer node A are described below with reference to the flowchart 900 of FIG. 13. Thus, in at least one embodiment, the flowchart 90 describes steps 902, 904, 906, 908, 910, 912, 914 and 916 that may further comprise the step S13; and the step 918 that may comprise the step S4. It should be noted that the steps 802, 804, 806, 808, 810, 812, 814, 816 and 818 of FIG. 8 are respectively similar to the step 902, 904, 906, 908, 910, 912, 914, 916 and 918 of FIG. 9 with the difference that the steps of FIG. 8 are performed when the initiator node receiving the write is the node A, and the steps of FIG. 9 are performed when the initiator node receiving the write is the node B.

In the step S13, the peer node A 402 receives (in a step 002) a message from the initiator node B. The message includes the descriptor information and the address of the allocated PDESC in the log 406 for the write I/O (received in the step S10) Following the step 902, the node A performs the step 904 and persistently stores the descriptor information of the write I/O in the PDESC located at the address in the log 406. In the step 904, the peer node A 402 also stores a copy of the PDESC of the write I/O in its node-local copy of the PDESCs 404a in its local memory (e.g., RAM or other form of volatile memory) accessible only to node B 404. Following the step 904 is a step 906.

In the step 906, the node A 402 performs processing to determine the LC with a corresponding LUN LBA range that includes the target logical address of the PDESC of the write I/O (e.g., the LBA of the target logical address of the PDESC of the write falls within the LUN LBA range of the LC). Put another way, the node A maps the LUN LBA of the PDESC of the write I/O to a particular LBA range of an LC that will include the log record for the write I/O, and then in the step 908, determines whether an instance of the LC exists in the FWS 402b of the node A.

If the step 908 evaluates to no, control proceeds to the step 910. At the step 910, if the instance of the LC does not already exist in the FWS 402b, then processing is performed where:
the instance of the LC is allocated or created and included in the FWS 402b;
the PDESC of the write I/O is included in the newly allocated LC of the FWS 402b; and
the instance of the newly allocated LC is assigned node B as the LC owner (the node that received the write I/O in the step S10).

Following the step 910, control proceeds to the step 918.

If the step 908 evaluates to yes where the particular instance of the LC does exist in the FWS 402b of the node A, then a further determination is made in the next step 912 to determine whether the owner of the LC instance in the FWS 402b is indicated as none. If the step 912 evaluates to yes where the ownership of the LC instance of the FWS 409b is none, then control proceeds to the step 914. At the step 914, the node A 402 may use a default deterministic technique to assign a default ownership of either node A or node B to the LC instance. In this case, the LC instance has an ownership state that transitions from "none" to the new owner node assigned by the default deterministic technique. In at least one embodiment, the default deterministic technique may be a deterministic function as described above for example in connection with FIG. 12. Following the step 914, control proceeds to the step 918.

It should be noted that if the owner of the LC instance in the FWS 402b of the peer node A is none (e.g., as determined when the step 912 evaluates to yes or true), it means that there are two concurrent writes directed to the same LUN LBA range of the LC being processed using the protocol, where one of the writes is received on node A and the other write is received on the node B. In this case, the embodiment may not use ALUA or may more generally not have an ALUA path states for the LUN set to active optimized for only a single one of the two nodes. Rather, the foregoing two concurrent writes indicate that the host is sending write I/Os directed to the same LUN to both of the nodes. If this condition occurs where there are two concurrent writes to the same LUN LBA received on the two nodes, an embodiment in accordance with the techniques herein may use the deterministic mathematical function to perform a default ownership assignment.

If the step 912 evaluates to no, where the particular instance of the LC does exist in the FWS 402b and the owner of the LC instance is something other than none (e.g., the owner of the existing LC instance is either node A or B), then control proceeds to the step 916. At the step 916, the PDESC of the write is added to the LC instance of the FWS 402b. In this case, the ownership has already been assigned in connection with a prior write that is logged and included in the LC instance of the FWS 402b. Following the step 916, control proceeds to the step 918. Following the step S13 is a step S14. The step S14 may include the processing of the step 918 of FIG. 13.

In the step S14, the peer node A 402 returns or sends (918) a response to the initiator node B 404 indicating that the PDESC is stored persistently in the log 406. The response may also indicate the current owner assigned to the LC. The node B 404 receives the response from the node A 402. Following the step S14 is a step S15.

In the step S15, the node B 404 may set the ownership of the instance of the LC of the local FWS 404*b* to the current owner of the LC as indicated in the response returned in the step S14 from the node A. Additionally, in the step S15, the node B 404 may also add the node B's local copy of the PDESC for the received write I/O to the instance of the LC included in the FWS 404*b*. Following the step S15 is a step S16. In the step S16, the initiator node B sends a response to the host regarding successful completion of the write I/O operation received in the step S10.

It should be noted that between the steps S14 and S15, an invariant of the algorithm or logic of the protocol and should always evaluate to true. The invariant is that, after the step S14 bur prior to the step S15, either the current ownership of the initiator node B's local copy of the LC instance is "none", or otherwise should be the same ownership value returned by the peer node B in the response in the step S14.

It should be noted that the processing of FIG. 11 is performed with respect to a write operation where a PDESC-PB pair is logged for the write operation. In some embodiments, other operations or requests may be similarly processed and logged as described in connection with the processing of FIG. 11. In at least one embodiment, some of the other operations or requests may only result in logging a PDESC without an associated PB. For example, an operation, command or request to create a snapshot may be logged using a PDESC assigned a sequence ID but where the PDESC is not associated with an allocated PB.

In at least one embodiment, the PB tiers 306*a-b* and the PDESC tier 306*c* may be implemented using ring buffers. As also noted above, an embodiment in accordance with the techniques herein may alternatively implement at least the PB tiers 306*a-b* as PB pools rather than as ring buffers. In at least one embodiment, each of the PB tiers 306*a-b* may be implemented as a separate PB pool. In at least one embodiment each PB pool, such as the PB tier 306*a*, may be an array or linked list of PB entries. In one embodiment, a list of PBs may be denoted as a list of indices associated with the PBs. A bit vector may include a different bit for each PB, where the bit associated with a PB has a value of 1 when the PB is allocated and the bit associated with the PB otherwise has a value of 0 when the PB is unallocated or free. Once a PB is flushed, it may be reclaimed or released immediately by indicating that its associated index or bit in the bit vector denotes the state of unallocated or free (e.g., where the bit is set to 0). With a PB pool, each PB may be released or reclaimed immediately after the data of the PB has been flushed or destaged to a BE PD.

In one embodiment in accordance with the techniques herein, each of the PB tiers 306*a-b* may be implemented as a separate PB pool such as an array of PBs. In such an embodiment, the PDESC tier may be implemented as a ring buffer as discussed elsewhere herein.

The proposed protocol described above in connection with the FIGS. 11, 12 and 13 guarantees race-free LC ownership assignment. Each LC, or more generally container, may be flushed by the owner node without requiring synchronization with the peer node. For the short time interval that an LC has an assigned owner of "none", the LC is not flush-able and is ignored by flusher worker threads or processes of the nodes A and B.

Consistent with discussion herein, flushing of the log may be triggered by any one or more defined trigger events. For example, flushing may be triggered in response to the amount of free log space falling below a specified threshold minimum level. In at least one embodiment, flushing may be performed independently by both nodes of the system using the synchronized node local FWS structures 402*b* of the node A and 404*b* of the node B. Each node of the system may execute one or more flush worker threads or processes that may run in parallel on the two nodes. In at least one embodiment, each node may execute multiple flush worker threads or processes, where a first set of the multiple flush worker threads may run in parallel on the node A and a second set of the multiple flush worker threads may run in parallel on the node B. The flush worker threads executing on the node A may use node A's local FWS 402*b* that includes LCs referencing the node A's local copies of the PDESCs 402*a*. Each flush worker thread of node A may select a number of LCs from the local FWS 402*b*, where the selected LCs all have an ownership of node A. In this manner, flush worker threads of the node A only access for flushing LCs having ownership of the node A. The flush worker threads executing on the node B may use node B's local FWS 404*b* that includes LCs referencing the node B's local copies of the PDESCs 404*a*. Each flush worker thread of node B may select a number of LCs from the local FWS 404*b*, where the selected LCs all have an ownership of the node B. In this manner, flush worker threads of the node B only access for flushing LCs having ownership of the node B. LCs have an ownership of "none" are ignored by all flush worker threads and not flushed until the ownership has transitioned to denote either the node A or the node B as the LC owner. Flushing an LC including a PDESC of a logged write operation may include using the PDESC of to access the PB containing the user data, storing the user data at a physical storage location on a BE PD, and updating the mapping information for the logical address of the PDESC to now indicate that the user data stored at the logical address is stored at the physical storage location.

As LCs of logged operations are detached and flushed from the log, the PDESC-PB pair of each flushed log record may be reclaimed for reuse. It should be noted that the log space reclamation process may vary with embodiment in accordance with the particular structures and policies used in implementing and maintaining the PDESCs and the PBs of the log.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing operations comprising:
   receiving a write operation at a first node of a data storage system, wherein the write operation writes first data to a target logical address, wherein the data storage system includes the first node and a second node, wherein the first node includes a first flushing working set (FWS) and a first set of page descriptors (PDESCs)

corresponding to recorded operations in a log, and wherein the second node includes a second FWS and a second set of PDESCs corresponding to the recorded operations in the log, wherein each of the recorded operations in the log is described by a PDESC-page block (PB) pair in the log; and performing first processing to record the write operation as a first PDESC-PB pair in the log, wherein the first processing includes:
  storing, by the first node, the first data in a first PB of the first PDESC-PB pair;
  determining by the first node that the target logical address of the write operation is included in a first logical block address (LBA) range and that the first FWS of the first node does not include a first instance of a first container associated with the first LBA range thereby indicating that the write operation is an initial write to the first instance of the first container of the first FWS;
  responsive to determining that the target logical address of the write operation is included in the first LBA range and that the first FWS of the first node does not include the first instance of the first container associated with the first LBA range, allocating the first instance of the first container in the first FWS and assigning none as a current owner of the first instance of the first container of the first FWS;
  sending, from the first node to the second node, a message requesting that the second node perform second processing in connection with servicing the write operation;
  receiving, at the first node from the second node, a response to the message, wherein the response indicates a current owner of the first container;
  assigning the current owner of the first container as indicated in the response as the current owner of the first instance of the first container of the first FWS; and
  adding a first PDESC of the first PDESC-PB pair for the write operation to the first instance of the first container of the first FWS.

2. The method of claim 1, wherein the second processing performed by the second node includes:
  storing a first PDESC of the first PDESC-PB pair in the log, wherein the first PDESC includes the target logical address and references the first PB;
  determining whether the second FWS includes a second instance of the first container;
  responsive to determining the second FWS does not include the second instance of the first container, performing third processing including:
    allocating the second instance of the first container of the FWS;
    adding the first PDESC to the second instance of the first container of the FWS; and
    returning the response to the first node, wherein the response indicates that the current owner of the first container is the first node.

3. The method of claim 2, wherein the second processing performed by the second node further includes:
  responsive to determining the second FWS does include the second instance of the first container, performing fourth processing including:
    determining whether a current owner of the second instance of the first container of the second FWS is none; and
    responsive to determining the current owner of the second instance of the first container of the second FWS is none, setting the current owner of the second instance of the first container of the second FWS to one of the first node and the second node selected in accordance with a deterministic function, and returning the response to the first node, wherein the response indicates that the current owner of the first container is the current owner of the second instance of the first container of the second FWS selected in accordance with the deterministic function.

4. The method of claim 3, wherein the fourth processing further includes:
  responsive to determining the current owner of the second instance of the first container of the second FWS is not none, performing fifth processing comprising:
    adding the first PDESC of the first PDESC-PB pair to the second instance of the first container of the second FWS of the second node; and
    returning the response to the first node, wherein the response indicates that the current owner of the first container is the current owner of the second instance of the first container of the second FWS of the second node.

5. The method of claim 3, wherein a metadata (MD) structure of mapping information is used to map logical addresses to corresponding physical storage locations including content stored at the logical addresses.

6. The method of claim 5, wherein the MD structure includes a plurality of levels of MD pages.

7. The method of claim 6, wherein the first container is one of a plurality of containers, and each of the plurality of containers is associated with a different MD page of the MD structure.

8. The method of claim 7, wherein the MD structure is a hierarchical structure including a plurality of MD leaf pages each associated with a range of logical block addresses (LBAs) of a logical device where said each MD leaf page associated with the range of LBAs is used in mapping logical addresses included in the range of LBAs of the logical device to corresponding physical storage locations, and wherein each of the plurality of containers is associated with one of the plurality of MD leaf pages.

9. The method of claim 8, wherein the first container is associated with a first MD leaf page of the plurality of MD leaf pages, the first MD leaf page is used in connection with mapping logical addresses included in a first LBA range of a first logical device to corresponding physical storage locations, and wherein the instance of the first container of the first FWS of the first node and the second instance of the first container of the second FWS of the second node each include PDESCs of the log for recorded write operations that write data to target logical addresses included in the first LBA range of the first logical device.

10. The method of claim 9, wherein the deterministic function determines ownership of a particular container in accordance with a particular one of the plurality of MD leaf pages associated with the particular container.

11. The method of claim 10, wherein each of the plurality of MD leaf pages has an associated unique identifier uniquely identifying each of the plurality of MD leaf pages.

12. The method of claim 11, wherein each of the plurality of MD leaf pages is assigned a unique identifier that is an integer.

13. The method of claim 12, wherein if the particular container is associated with the particular one of the plurality of MD leaf pages having a unique identifier that is an even integer, the deterministic function assigns the first node as a current owner of the particular container, and otherwise assigns the second node as the current owner of the particular container.

14. The method of claim 1, further comprising flushing the log, wherein said flushing the log includes:
a first code entity executing on the first node flushing a first set of one or more instances of containers of the first FWS of the first node, wherein each instance of a container in the first set has the first node assigned as current owner of said each instance.

15. The method of claim 14, wherein said flushing the log includes:
a second code entity executing on the second node flushing a second set of one or more instances of containers of the second FWS of the second node, wherein each instance of a container in the second set has the second node assigned as current owner of said each instance.

16. The method of claim 1, wherein any instance of a container in the first FWS having a current owner of none is not flushed from the log, and any instance of a container in the second FWS having a current owner of none is not flushed from the log.

17. The method of claim 1, wherein the write operation writes to a logical device, wherein the write operation is sent by a host to the first node of the data storage system over a first path, wherein the logical device is exposed to the host over a first plurality of paths, including the first path, from the first node of the data storage system, wherein the logical device is exposed to the host over a second plurality of paths from the second node of the data storage system, wherein at least the first path of the first plurality of paths has an associated access state of preferred or active optimized, the second plurality of paths from the second node to the host have an associated access state of non-preferred or active non-optimized, wherein the host sends I/Os directed to the logical device over any path of the first plurality of paths and the second plurality of paths having an associated access state of preferred or active optimized, wherein the host only sends I/Os directed to the logical device over any path of the first plurality of paths and the second plurality of paths having an associated access state of non-preferred or active non-optimized when there is no path in the first plurality of paths and the second plurality of paths that is preferred or active optimized.

18. A system comprising:
one or more processors; and
a memory comprising code stored thereon that, when executed, performs a method of processing operations comprising:
receiving a write operation at a first node of a data storage system, wherein the write operation writes first data to a target logical address, wherein the data storage system includes the first node and a second node, wherein the first node includes a first flushing working set (FWS) and a first set of page descriptors (PDESCs) corresponding to recorded operations in a log, and wherein the second node includes a second FWS and a second set of PDESCs corresponding to the recorded operations in the log, wherein each of the recorded operations in the log is described by a PDESC-page block (PB) pair in the log; and
performing first processing to record the write operation as a first PDESC-PB pair in the log, wherein the first processing includes:
storing, by the first node, the first data in a first PB of the first PDESC-PB pair;
determining by the first node that the target logical address of the write operation is included in a first logical block address (LBA) range and that the first FWS of the first node does not include a first instance of a first container associated with the first LBA range thereby indicating that the write operation is an initial write to the first instance of the first container of the first FWS;
responsive to determining that the target logical address of the write operation is included in the first LBA range and that the first FWS of the first node does not include the first instance of the first container associated with the first LBA range, allocating the first instance of the first container in the first FWS and assigning none as a current owner of the first instance of the first container of the first FWS;
sending, from the first node to the second node, a message requesting that the second node perform second processing in connection with servicing the write operation;
receiving, at the first node from the second node, a response to the message, wherein the response indicates a current owner of the first container;
assigning the current owner of the first container as indicated in the response as the current owner of the first instance of the first container of the first FWS; and
adding a first PDESC of the first PDESC-PB pair for the write operation to the first instance of the first container of the first FWS.

19. A non-transitory computer readable medium comprising code stored thereon that, when executed, performs a method of processing operations comprising:
receiving a write operation at a first node of a data storage system, wherein the write operation writes first data to a target logical address, wherein the data storage system includes the first node and a second node, wherein the first node includes a first flushing working set (FWS) and a first set of page descriptors (PDESCs) corresponding to recorded operations in a log, and wherein the second node includes a second FWS and a second set of PDESCs corresponding to the recorded operations in the log, wherein each of the recorded operations in the log is described by a PDESC-page block (PB) pair in the log; and
performing first processing to record the write operation as a first PDESC-PB pair in the log, wherein the first processing includes:
storing, by the first node, the first data in a first PB of the first PDESC-PB pair;
determining by the first node that the target logical address of the write operation is included in a first logical block address (LBA) range and that the first FWS of the first node does not include a first instance of a first container associated with the first LBA range thereby indicating that the write operation is an initial write to the first instance of the first container of the first FWS;
responsive to determining that the target logical address of the write operation is included in the first LBA range and that the first FWS of the first node does not include the first instance of the first container associated with the first LBA range, allocating the first instance of the first container in the first FWS and assigning none as a current owner of the first instance of the first container of the first FWS;

sending, from the first node to the second node, a message requesting that the second node perform second processing in connection with servicing the write operation;

receiving, at the first node from the second node, a response to the message, wherein the response indicates a current owner of the first container;

assigning the current owner of the first container as indicated in the response as the current owner of the first instance of the first container of the first FWS; and adding a first PDESC of the first PDESC-PB pair for the write operation to the first instance of the first container of the first FWS.

\* \* \* \* \*